(12) United States Patent
Nakano et al.

(10) Patent No.: US 7,242,447 B2
(45) Date of Patent: Jul. 10, 2007

(54) COLOR FILTER SUBSTRATE, TRANSFLECTIVE SUBSTRATE, METHOD FOR PRODUCING THE COLOR FILTER SUBSTRATE, ELECTRO-OPTICAL DEVICE, AND ELECTRONIC APPARATUS

(75) Inventors: Tomoyuki Nakano, Toyoshima-machi (JP); Keiji Takizawa, Toyoshima-machi (JP); Toshihiro Otake, Okaya (JP)

(73) Assignee: Seiko Epson Corporation (JP)

( * ) Notice: Subject to any disclaimer, the term of this patent is extended or adjusted under 35 U.S.C. 154(b) by 117 days.

(21) Appl. No.: 10/887,470

(22) Filed: Jul. 8, 2004

(65) Prior Publication Data

US 2005/0030455 A1 Feb. 10, 2005

(30) Foreign Application Priority Data

Jul. 18, 2003 (JP) ............................. 2003-199460

(51) Int. Cl.
G02F 1/1335 (2006.01)
(52) U.S. Cl. ....................... 349/114; 349/106
(58) Field of Classification Search ............... 349/106, 349/114
See application file for complete search history.

(56) References Cited

U.S. PATENT DOCUMENTS 6,621,543 B2* 9/2003 Moon ........................ 349/115
6,885,418 B2* 4/2005 Matsushita et al. ......... 349/113
6,972,814 B2* 12/2005 Jung ........................... 349/114

FOREIGN PATENT DOCUMENTS

| JP | 2001-033778 | 2/2001 |
|---|---|---|
| JP | 2001-159755 | 6/2001 |
| JP | 2002-214621 | 7/2002 |
| JP | 2003-121830 | 4/2003 |
| JP | 2003-121831 | 4/2003 |
| JP | 2003-149631 | 5/2003 |

OTHER PUBLICATIONS

Communication from Japanese Patent Office re: counterpart application.
Communication from Chinese Patent Office regarding corresponding application.

* cited by examiner

*Primary Examiner*—David Nelms
*Assistant Examiner*—Richard H Kim
(74) *Attorney, Agent, or Firm*—Harness, Dickey & Pierce, P.L.C.

(57) ABSTRACT

A color filter substrate is provided that includes a base plate, a resin layer disposed on the base plate, a reflective layer disposed on the resin layer and including a reflective portion and an transmissive portion, and a colored layer disposed on the reflective layer. An area of the resin layer corresponding to at least a portion of the transmissive portion is colored with the same color as the colored layer disposed in correspondence with the transmissive portion.

14 Claims, 16 Drawing Sheets

COLOR FILTER SUBSTRATE, TRANSFLECTIVE SUBSTRATE, METHOD FOR PRODUCING THE COLOR FILTER SUBSTRATE, ELECTRO-OPTICAL DEVICE, AND ELECTRONIC APPARATUS

RELATED APPLICATIONS

This application claims priority to Japanese Patent Application No. 2003-199460 filed Jul. 18, 2003 which is hereby expressly incorporated by reference herein in its entirety.

BACKGROUND

1. Technical Field of the Invention

The present invention relates to a color filter substrate installed in, for example, a transflective liquid crystal device serving as an electro-optical device, a method for producing the color filter substrate, the electro-optical device, and an electronic apparatus.

2. Description of the Related Art

A transflective liquid crystal device serving as an electro-optical device comprises a liquid crystal panel having a plurality of pixels and illuminating means for illuminating the liquid crystal panel with light. In the liquid crystal panel, for example, a reflective layer is disposed on a resin layer at each pixel. The reflective layer comprises a reflective portion for reflecting outside light and a transmissive portion formed by, for example, an opening in a reflective film. In this liquid crystal device, transmissive display is achieved by transmitting illuminating light through the transmissive portion of the reflective layer when the illuminating means is turned on, and reflective display is achieved by reflecting outside light by the reflective portion of the reflective layer when the illuminating means is turned off (refer to, for example, Japanese Unexamined Patent Application Publication No. 2003-121830 (page 3, FIG. 11)). In order for such a transflective liquid crystal device to provide color display, a colored layer is disposed at a viewing side (outside light incident side) of the reflective layer.

In the transflective liquid crystal device comprising a colored layer, illuminating light transmitted through the transmissive portion at each pixel passes through the colored layer only once in a transmissive display state, whereas outside light passes through the colored layer twice in a reflective display state. This gives rise to the problem that color reproducibility in the transmissive display and that in the reflective display greatly differ from each other.

The present invention makes it possible to solve the aforementioned problem, and has as an object the provision of a color filter substrate which has good display properties and which makes it easy to adjust chromaticity in transmissive display and in reflective display in a transflective electro-optical device, a transflective substrate, a method for producing the color filter substrate, an electro-optical device, and an electronic apparatus.

SUMMARY

To this end, there is provided a color filter substrate comprising a base plate, a resin layer disposed over the base plate, a reflective layer disposed at certain areas over the resin layer, a transmissive portion located over the resin layer at other areas different from the certain areas where the reflective layer is disposed, and a colored layer disposed over at least the reflective layer. In the color filter substrate, at least a portion of an area corresponding to the transmissive portion of the resin layer is colored.

In a transflective electro-optical device using such a color filter substrate of the present invention, the colored layer is used to color a reflective display, and at least the resin layer is used to color a transmissive display. Therefore, it is possible to freely determine the chromaticity of the resin layer by the state of the colored layer corresponding to the transmissive portion. Consequently, it is possible to adjust the chromaticity in the reflective display and that in the transmissive display substantially separately, so that a color filter substrate having good color display properties can be provided.

The color filter substrate may be such that the colored layer is disposed over the transmissive portion, and at least the portion of an area corresponding to the transmissive portion of the resin layer is colored with a hue which is the same as that of the colored layer disposed in correspondence with the transmissive portion.

Accordingly, the area corresponding to the transmissive portion of the resin layer can be formed with the same hue as the colored layer disposed in correspondence with the area.

The color filter substrate may be such that the area corresponding to the transmissive portion of the resin layer is colored so that a combined color of the resin layer and the colored layer is blue represented by variables in the relationships $0.15<x<0.26$, $0.17<y<0.28$, and $25<Y<70$ in an XYZ color system.

By virtue of such a structure, it is possible to provide an electro-optical device having excellent color display properties in the transmissive display when the color filter substrate is incorporated in the electro-optical device by forming the resin layer and the colored layer so that their combined color is blue represented by the variables in the relationships $0.15<x<0.26$, $0.17<y<0.28$, and $25<Y<70$ in the XYZ color system. In the transmissive display, the color display properties are determined by the colored layer and the resin layer. Therefore, it is possible to substantially separately adjust the color display properties in the reflective display and those in the transmissive display by forming the colored layer with a chromaticity suitable for the reflective display, and by determining the chromaticity of the resin layer so that light transmitted through the colored layer and the resin layer provides desired color display properties in the transmissive display. Consequently, the design range for color display is increased, thereby making it possible to provide a color filter substrate having excellent color display properties.

The color filter substrate may be such that the colored layer is not disposed in the area corresponding to the transmissive portion, and the color of at least the portion of an area corresponding to the transmissive portion of the resin layer is blue represented by variables in the relationships $x<0.17$, $y<0.22$, and $5<Y<40$ in an XYZ color system.

By virtue of such a structure, it is possible to provide an electro-optical device having excellent color display properties in the transmissive display when the color filter substrate is incorporated in the electro-optical device by forming the area of the resin layer corresponding to the transmissive portion so that its color is blue represented by the variables in the relationships $x<0.17$, $y<0.22$, and $5<Y<40$ in the XYZ color system. Since the colored layer is not disposed at the area corresponding to the transmissive portion, the color display properties are determined by the colored layer in reflective display, and by the resin layer in the transmissive display. Therefore, it is possible to completely separately adjust the color display properties in the reflective display and those in the transmissive display. Consequently, the design range for color display is increased, thereby making it possible to provide a color filter substrate having desired color display properties.

The color filter substrate may be such that the color of the colored layer is blue represented by variables in the relationships $0.15<x<0.26$, $0.17<y<0.28$, and $25<Y<70$ in the XYZ color system.

By virtue of such a structure, it is possible to provide a color filter substrate having excellent color display properties in the reflective display by forming the colored layer so that its color is blue represented by the variables in the relationships $0.15<x<0.26$, $0.17<y<0.28$, and $25<Y<70$ in the XYZ color system.

The color filter substrate may be such that the colored layer comprises colored layer segments of a plurality of colors, and the resin layer is colored using at least one of the plurality of colors, and has an opening corresponding to the transmissive portion disposed in correspondence with the colored layer segments of the other color or colors.

By virtue of such a structure, the color display properties in the colored layer in the transmissive display are determined by the colors of the colored layer without being influenced by the color of the resin layer by disposing an opening in the resin layer in correspondence with the transmissive portion of the colored layer where it is colored with a color other than the color of the resin layer. For example, when three colors, red, green, and blue are used in the colored layer, and blue is used in the resin layers, an opening is formed in an area corresponding to the transmissive portion of the resin layer corresponding to the red and the green portion of the colored layer. Therefore, the color display properties in the transmissive display are determined by the colors of the colored layer without the red and the green being influenced by the color of the resin layer. In this case, the resin layer can be formed using one color as a result of forming an opening in the resin layer, so that it is not necessary to increase the number of steps of producing the resin layer.

At least blue may be included in the plurality of colors.

By virtue of such a structure, the resin layer is colored at least blue, and the transmissive display at a blue pixel can be carried out using at least the resin layer, so that it is possible to provide a color filter substrate having good color display properties. In a transflective electro-optical device, when the colored layer is used in common in the transmissive display and in the reflective display, compared to the chromaticities of a red pixel and a green pixel, the chromaticity of the blue pixel tends to be dark in the reflective display, thereby making it difficult to control the difference between the chromaticity in the transmissive display and the chromaticity in the reflective display. Therefore, by virtue of the above-described structure, the transmissive display, with blue having a chromaticity that is most difficult to adjust, can be carried out by at least the resin layer, thereby making it possible to easily adjust the color display properties.

The color filter substrate may be such that the colored layer comprises colored layer segments of a plurality of colors, and at least the area corresponding to the transmissive portion of the resin layer is colored with the same hues as the colored layer segments disposed in correspondence with the transmissive portion.

By virtue of such a structure, the design range for color display is further increased, so that a color filter substrate having excellent color display properties can be provided. In other words, since the transmissive display in all of the colors is carried out using at least the resin layer, it is possible to substantially separately adjust the color display properties of the reflective display and those of the transmissive display. Here, when the colored layer is not disposed at the area corresponding to the transmissive portion, the color display properties are determined by the colored layer in the reflective display, and by the resin layer in the transmissive display. In contrast, when the colored layer is disposed at the area corresponding to the transmissive layer, the color display properties are determined by the colored layer in the reflective display, and by the resin layer and the colored layer in the transmissive display.

A transflective substrate of an electro-optical device comprising the transflective substrate and a color filter substrate comprises a resin layer, a reflective layer, and a transmissive portion. The reflective layer is disposed at certain areas over the resin layer. The transmissive portion located over the resin layer at other areas different from the certain areas where the reflective layer is disposed. The color filter substrate includes a colored layer disposed so as to overlap at least the reflective layer in a plane. At least a portion of an area corresponding to the transmissive portion of the resin layer is colored with a hue which is the same as that of the colored layer disposed in correspondence with the transmissive portion.

In a transflective electro-optical device using such a transflective substrate of the present invention, the reflective display is colored by the colored layer, and the transmissive display is colored by at least the resin layer. Therefore, it is possible to freely determine the chromaticity of the resin layer by the state of the colored layer at the area corresponding to the transmissive portion. Consequently, it is possible to adjust the chromaticity in the reflective display and that in the transmissive display substantially separately, so that an electro-optical device having good color display properties can be provided.

A method of the present invention for producing a color filter substrate comprises the steps of forming a colored resin layer over a substrate; forming a reflective layer over the colored resin layer, the reflective layer including a reflective portion where the reflective layer is disposed and a transmissive portion where the reflective layer is not disposed; and forming a colored layer having the same hue as the colored resin layer over the reflective layer.

In a transflective electro-optical device using the color filter substrate produced by such a method of the present invention, the reflective display is colored by the colored layer, and the transmissive display is colored by at least the resin layer. Therefore, it is possible to freely determine the chromaticity of the resin layer by the state of the colored layer at the area corresponding to the transmissive portion. Consequently, it is possible to adjust the chromaticity in the reflective display and that in the transmissive display substantially separately and easily, so that an electro-optical device having good color display properties can be provided.

The color filter substrate may be such that the colored layer comprises colored layer segments of a plurality of colors, and the colored resin layer is colored using one of the plurality of colors, and has an opening corresponding to the transmissive portion disposed in correspondence with the colored layer segments of the other color or colors.

By virtue of such a structure, the color filter substrate can be produced without increasing the number of steps of producing the color filter substrate compared to that of a related method for producing a color filter substrate comprising a transparent resin layer. In other words, by disposing an opening in the resin layer in correspondence with the transmissive portion of the colored layer where it is colored with a color other than the color of the resin layer, the color display properties of the colored layer are not affected by the color of the resin layer in the transmissive display. Therefore, since the resin layer can be formed with one color by disposing an opening in the resin layer, it is not necessary to increase the number of steps for producing the color filter substrate compared to that of the related method.

An electro-optical device comprises a resin layer, a reflective layer disposed at certain areas over the resin layer, a transmissive portion located over the resin layer at other areas different from the certain areas where the reflective layer is disposed, and a colored layer overlapping at least the reflective layer in a plane. In the electro-optical device, at least a portion of an area corresponding to the transmissive portion of the resin layer is colored with a hue which is the same as that of the colored layer disposed in correspondence with the transmissive portion.

According to the electro-optical device having such a structure of the present invention, the reflective display is colored by the colored layer, and the transmissive display is colored by at least the resin layer. Therefore, it is possible to freely determine the chromaticity of the resin layer by the state of the colored layer disposed at the area corresponding to the transmissive portion. Consequently, it is possible to adjust the chromaticity in the reflective display and that in the transmissive display substantially separately and easily, so that an electro-optical device having good color display properties can be provided.

Another electro-optical device of the present invention comprises any one of the above-described color filter substrates or the above-described transflective substrate.

By virtue of the structure of the present invention, it is possible to provide an electro-optical device having good color display properties.

An electro-optical apparatus of the present invention comprises either of the above-described electro-optical devices and means for controlling the electro-optical device.

Examples of the electro-optical apparatus include a cellular phone, a hand-held terminal, and an electronic wristwatch. The electronic apparatus comprises a screen providing excellent color display.

DETAILED DESCRIPTION

A color filter substrate, a transflective substrate, a method for producing the color filter substrate, an electro-optical device, and an electronic apparatus of embodiments of the present invention will be described below with reference to the attached drawings, taking as an example the case in which a liquid crystal device is constructed as an electro-optical device.

Color Filter Substrate, Method for Producing the Color Filter Substrate, and Electro-Optical Device

FIRST EMBODIMENT

Figure 1:
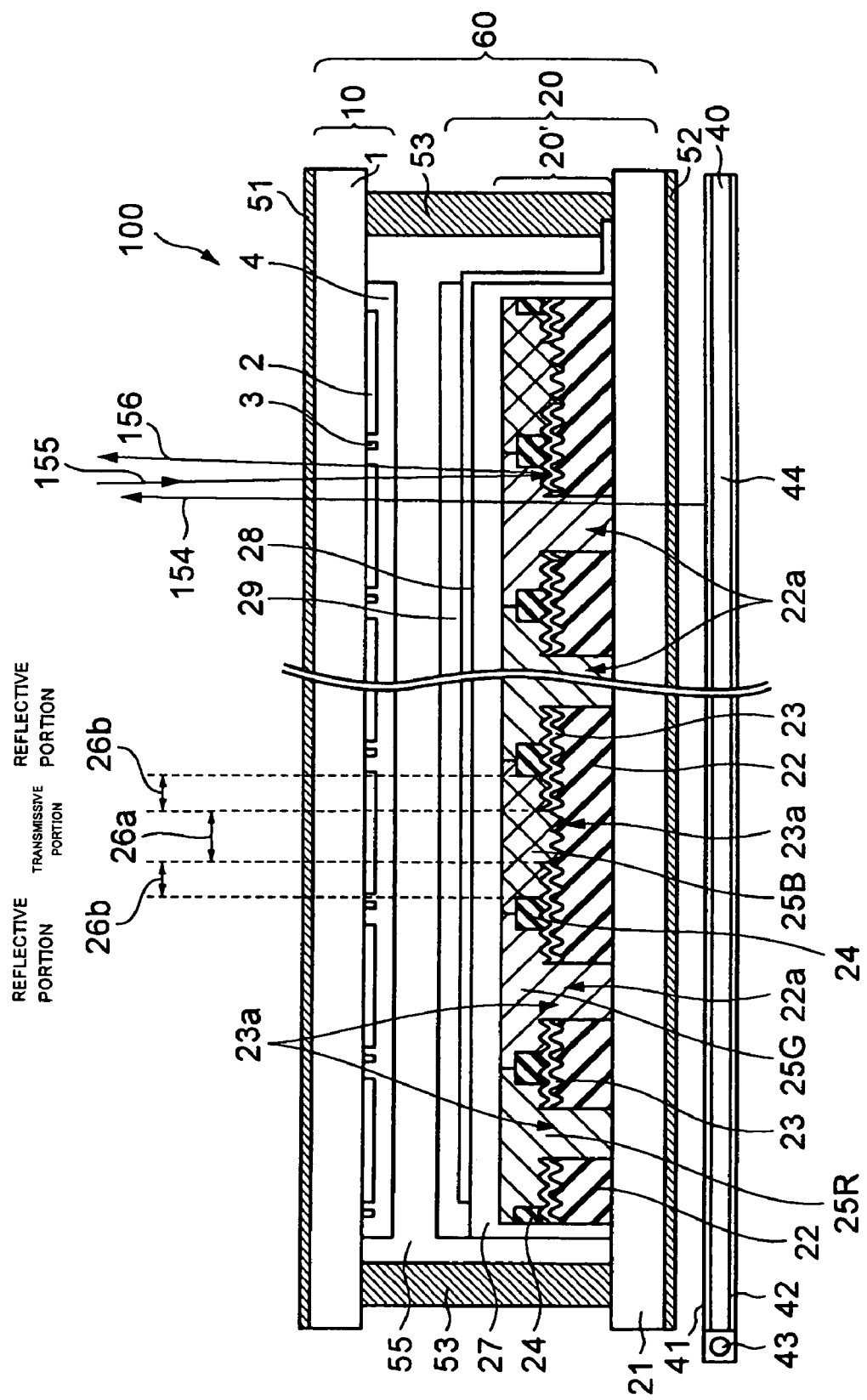
FIG. 1 is a schematic sectional view of the entire structure of a liquid crystal device of a first embodiment.
Figure 2:
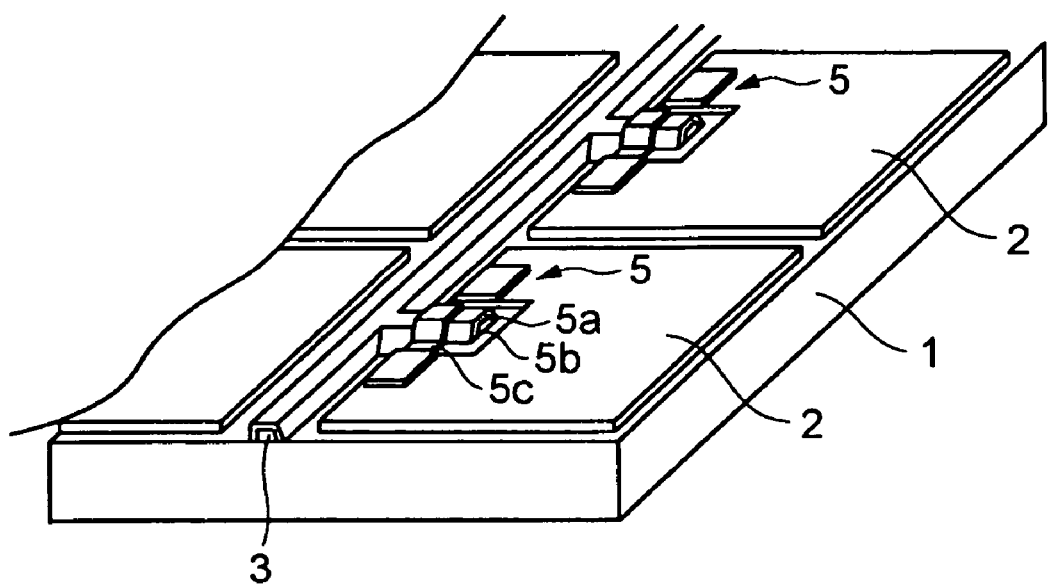
FIG. 2 is a schematic perspective view of the structure of and around TFD elements.
Figure 3A:
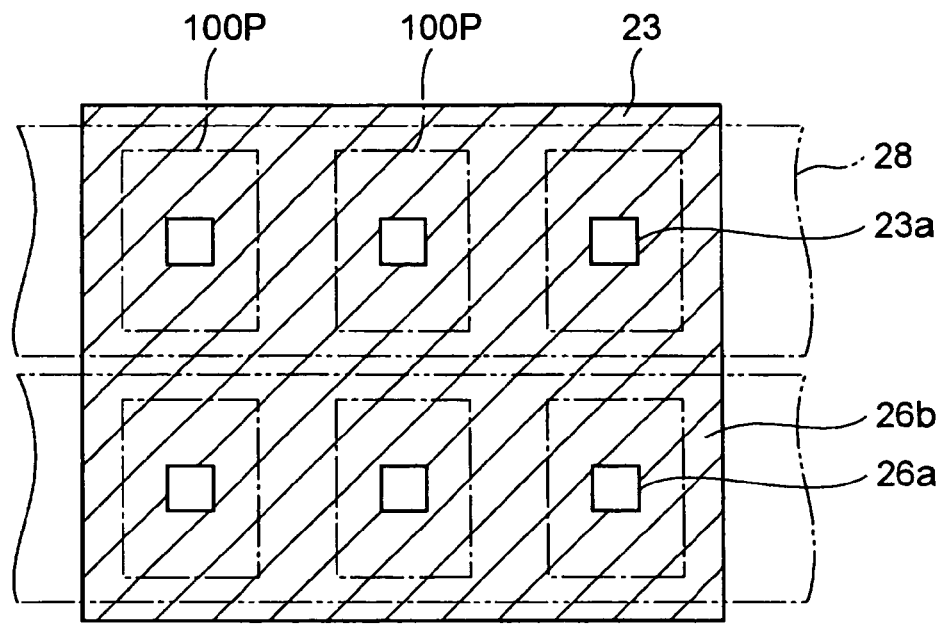
FIGS. 3A–B are schematic plan views showing planar shapes of a light-shielding layer and a colored layer of the liquid crystal device shown in FIG. 1.
Figure 3B:
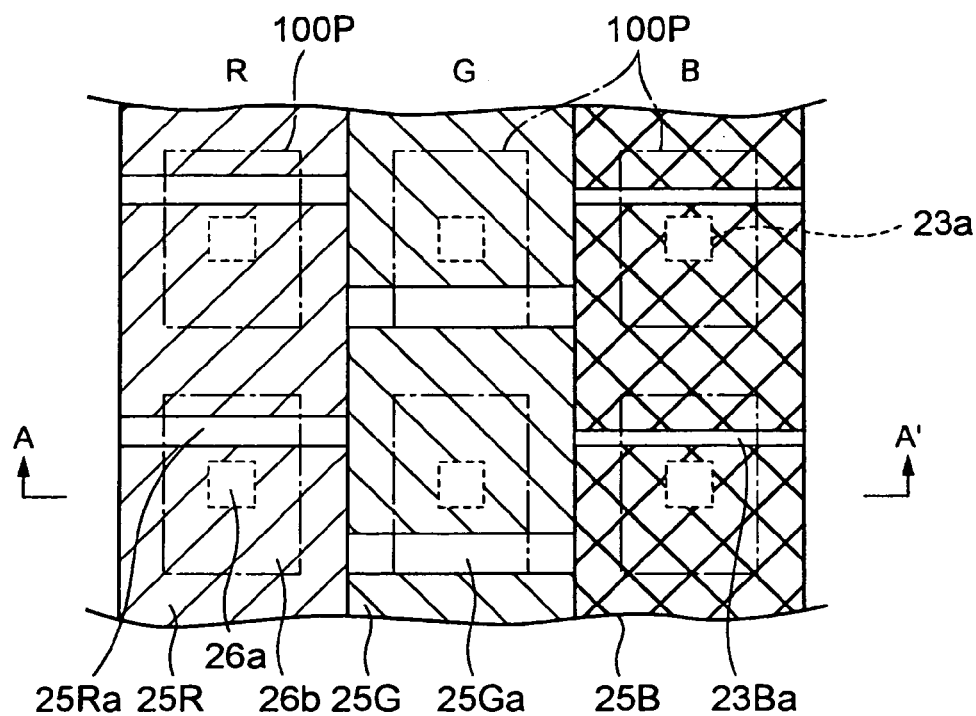
Figure 4:
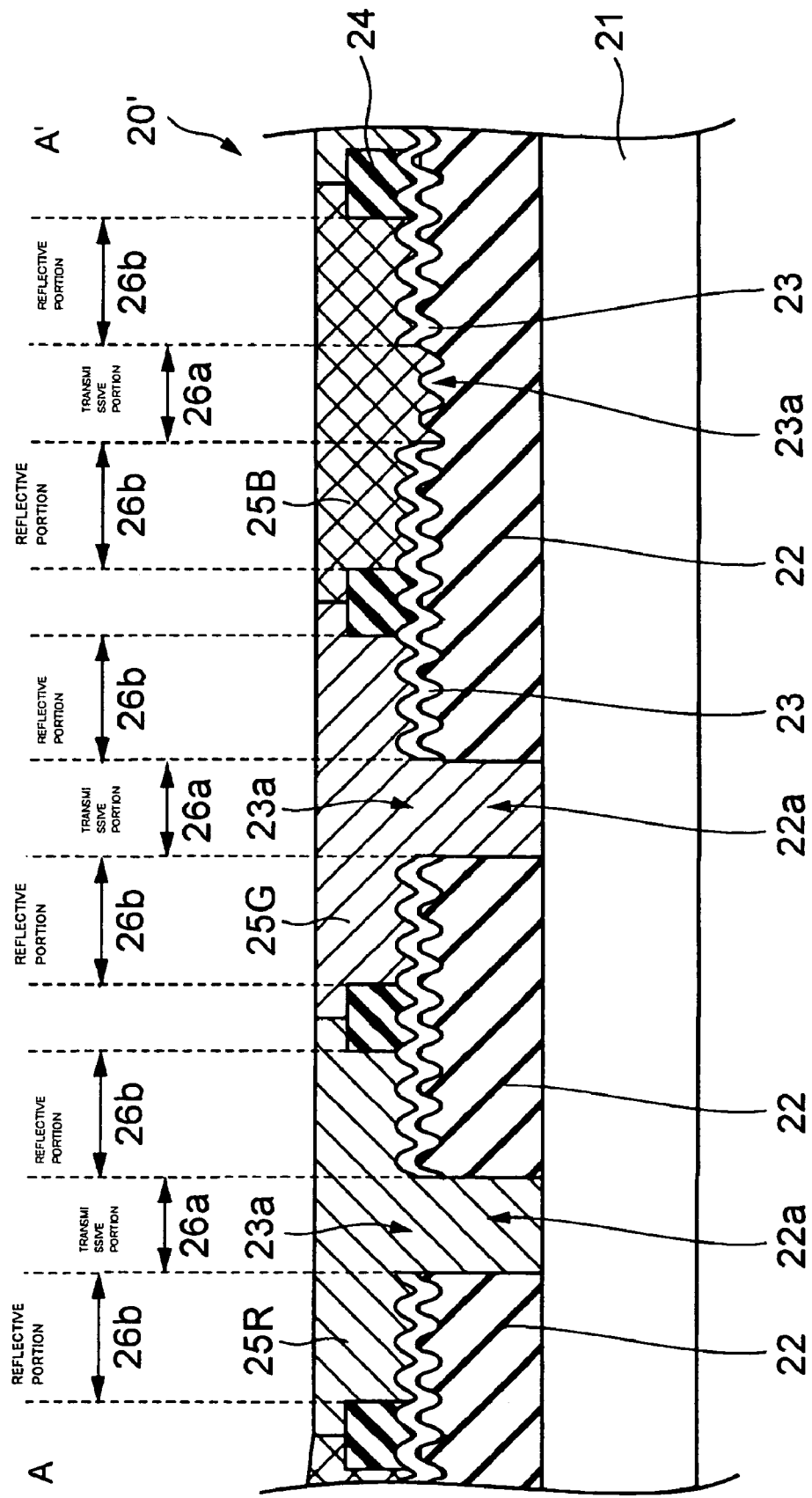
FIG. 4 is a schematic sectional view of a color filter substrate of the liquid crystal device shown in FIG. 1.

FIG. 1 is a schematic sectional view of a liquid crystal device serving as an electro-optical device of the first embodiment and incorporating a color filter substrate of the present invention. FIG. 2 is a schematic perspective view of TFD elements, scanning lines, and pixel electrodes formed on an opposing substrate of the electro-optical device. FIG. 3(a) is a schematic partial plan view showing the relationship between the positions of a reflective layer and the scanning lines of the liquid crystal device shown in FIG. 1. FIG. 3(b) corresponding to FIG. 3(a) is a plan view illustrating planar shapes of a colored layer, and a schematic plan view showing in an enlarged form a portion of the color filter substrate in the embodiment. FIG. 4 is a sectional view taken along the line A–A' of FIG. 3(b).

A liquid crystal device 100 shown in FIG. 1 has a transflective active matrix structure. The liquid crystal device 100 comprises a liquid crystal panel 60 and a backlight 40 disposed adjacent thereto. The liquid crystal panel 60 comprises an opposing substrate 10, a color filter electrode substrate 20, a sealant 53 for affixing the two substrates, a liquid crystal layer 55 sandwiched between the two substrates 10 and 20, and a pair of polarizers 51 and 52 disposed so as to sandwich the two substrates 10 and 20.

The backlight 40 comprises a light source 43, a light guide plate 44, a diffusing plate 41, and a reflective plate 42. The light guide plate 44 guides light emitted from the light source 43 to the entire surface of the liquid crystal panel 60. The diffusing plate 41 uniformly diffuses the light guided to the light guide plate 44 with respect to the liquid crystal panel 60. The reflective plate 42 reflects light emitted from the light guide plate 44 to a side opposite to the side where the liquid crystal panel 60 is disposed towards the liquid crystal panel 60. The light source 43 is not always turned on. It is used in an environment like that in which there is almost no outside light by turning it on in accordance with an instruction from a user or a detection signal from a sensor, as a result of which transmissive display is carried out.

As shown in FIGS. 1 and 2, the opposing substrate 10 comprises a glass base plate 1, stripe-shaped scanning lines 3 disposed on the glass base plate 1, TFD elements 5 electrically connected to the scanning lines 3, pixel electrodes 2 electrically connected to the scanning lines 3 through the TFD elements 5, and an alignment layer 4 covering them. Each TFD element 5 is a two-terminal switching element having nonlinear current-voltage characteristics, and comprises a first metallic film 5a, an oxide film 5b, and a second metallic film 5c. Each first metallic film 5a is a portion branching from its corresponding scanning line 3. Each oxide film 5b is an insulator formed on the surface of its corresponding first metallic film 5a by anodic oxidation. Each second metallic film 5c is formed of, for example, chromium on the top surface of its corresponding oxide film 5b. The second metallic films 5c of the TFD elements 5 are connected to the corresponding pixel electrodes 2. The alignment layer 4 is a thin organic film formed of polyimide or the like, and is rubbed.

As shown in FIG. 1, the color filter electrode substrate 20 is formed by successively disposing an overcoat layer 27, an opposing electrode 28, and an alignment layer 29 upon a colored layer 25 of a color filter substrate 20' shown in FIG. 4. The opposing electrode 28 is disposed in a stripe in a direction perpendicular to the scanning lines 3 and so as to oppose the pixel electrodes 2. The alignment layer 29 is a thin organic film formed of polyimide or the like, and is rubbed.

In the liquid crystal device 100 of the embodiment, pixels are formed by the opposing electrode 28, the pixel electrodes 2, portions of the liquid crystal layer 55 corresponding to intersections of the opposing electrode 28 and the pixel electrodes 2; and a displaying operation is performed by optically changing the liquid crystal layer 55 at the pixels. The liquid crystal device 100 performs reflective display when there is a sufficient amount of outside light, and transmissive display using light emitted from the light source when there is an insufficient amount of outside light.

The structure of the color filter substrate 20' will be described in detail below. The color filter substrate 20' comprises a colored layer of three colors, red, blue, and green. As shown in FIGS. 1 and 4, in the color filter substrate 20', a blue resin layer 22 having a hue that is the same as that of blue (which is one of the three colors of the colored layer) is disposed on a glass base plate 21, and a reflective layer 23 having openings 23a is disposed on the resin layers 22. The blue resin layer has the same hue as a blue colored layer segment 25B (described later). Further, a light-shielding layer 24 is disposed on the reflective layer 23 in a lattice so as to section the pixels, and the colored layer 25 of three colors, red (R), green (G), and blue (B), is disposed on the reflective layer 23 in a stripe in a direction perpendicular to the opposing electrode 28 so as to embed the areas sectioned by the light-shielding layer 24.

When the liquid crystal device 100 is viewed in a direction perpendicular to the substrate, the colored layer 25 is disposed so as to overlap the reflective layer 23 in a plane.

As shown in FIG. 3(a), one opening 23a, which serves as a transmissive portion 26a, is disposed in the reflective layer 23 (in an area marked by slanted lines extending towards the upper right in the figure) at each pixel 100P (an area surrounded by an alternate long and short dash line). Each pixel 100P includes a reflective portion 26b and the corresponding transmissive portion 26a. The reflective layer 23 is disposed at the reflective portions 26b, and is not disposed at the transmissive portions 26a corresponding to the openings 23a. The pixels 100P are areas that contribute to the actual displaying operation.

As shown in FIGS. 1, 3(b), and 4, first openings 22a are formed in an area of the resin layer 22 corresponding to the transmissive portion 26a of the reflective layer 23 at a red colored layer segment 25R and in an area of the resin layer 22 corresponding to the transmissive portion 26a of the reflective layer 23 at a green colored layer segment 25G. The resin layer 22 does not exist in the first openings 22a, that is, the red colored layer segment 25R and the green colored layer segment 25G are disposed in the first openings 22a. The resin layer 22 exists in an area of the resin layer 22 corresponding to the transmissive portion 26a of the reflective layers 23 at the blue colored layer segment 25B. The colored layer segments 25R, 25G, and 25B have color-free area layers 25Ra, 25Ga, and 25Ba, respectively, where the colored layer segments 25R, 25G, and 25B are not disposed at portions of areas corresponding to the reflective portions 26b of the pixels 100P, that is, the areas where the reflective layer 23 is not covered by the colored layer 25. The transparent overcoat layer 27 exists at openings which are the color-free area layers 25a of the colored layer 25. In the embodiment, the color-free area layers 25a have substantially planar rectangular shapes that cross the rectangular pixels 100P, but the shapes are not limited thereto. In the embodiment, the color-free area layers 25a are provided in order to compensate for insufficient brightness in the reflective display. Further, the planar areas of the color-free area layers 25Ra, 25Ga, and 25Ba are such that 25Ga>25Ra>25Ba because the optimal chromaticity of each color is different.

As shown in FIG. 1, in the liquid crystal device 100, when the reflective display is performed, outside light 155, which is a portion of outside light, such as natural light or light from indoor lighting, traveling towards and impinging upon the liquid crystal device 100 is transmitted through the opposing substrate 10, the liquid crystal layer 55, and the colored layer 25. Then, it is reflected by the corresponding reflective portion 26b of the reflective layer 23 as reflected light 156, is transmitted again through the colored layer 25, the liquid crystal layer 55, and the opposing substrate 10, and exits from the liquid crystal device 100. Accordingly, the light used for display is transmitted through the colored layer twice. In addition, when the reflective display is performed, other portions of the outside light, such as natural light or light from indoor lighting, traveling towards and impinging upon the liquid crystal device 100 are transmitted through the opposing substrate 10, the liquid crystal layer 55, and the color-free area layers 25a. Then, they are reflected by the reflective portions 26b of the reflective layer 23; are transmitted again through the color-free area layers 25a, the liquid crystal layer 55, and the opposing substrate 10; and exit from the liquid crystal device 100.

In contrast, when the transmissive display is performed, light 154 emitted from the backlight 40 is transmitted through the liquid crystal panel 60, and exits from the liquid crystal device 100. Accordingly, the light used for display is transmitted through the colored layer once.

Here, as mentioned above, in the pixel 100P corresponding to the red colored layer segment 25R and the pixel 100P corresponding to the green colored layer segment 25G, the areas of the resin layer 22 corresponding to the transmissive portions 26a are first openings 22a where the resin layer 22 does not exist. Therefore, in the transmissive display, the display colors of the red pixel 100P and the green pixel 100P are determined by the colored layer segment 25R and the colored layer segment 25G, respectively. In contrast, as mentioned above, in the pixel 100P corresponding to the blue colored layer segment 25B, the blue resin layer 22 exists at the area of the resin layer 22 corresponding to the transmissive portion 26a.

Therefore, the display colors of the blue pixel 100P are determined by the blue resin layer 22 and the colored layer segment 25B in the transmissive display, and by the colored layer segment 25B in the reflective display.

As in the case of the blue pixel, by performing the color transmissive display using the resin layer 22 and the colored layer 25, and by performing color reflective display using only the colored layer 25, it becomes easier to adjust the chromaticity in the transmissive display and that in the reflective display, so that a desired chromaticity can be obtained in both the transmissive display and the reflective display. Therefore, it is possible to provide a liquid crystal device having good display properties. In other words, the chromaticities of the colors of the colored layer 25 are previously determined so as to be suitable for the reflective display, that is, so that the light transmitted through the colored layer twice has desired color display properties. Thereafter, the chromaticity of the color of the resin layer 22 is determined so that the light transmitted through the colored layer 25 and the resin layer 22 has desired color display properties in the transmissive display. This allows the color display properties of the transmissive display and those of the reflective display to be adjusted substantially separately, thereby making it easier to carry out the adjustments. In the embodiment, the chromaticity of the blue colored layer segment 25B is less than the chromaticity of the blue resin layer 22. In addition, the blue colored layer segment 25B and the blue resin layer 22 are colored so that their combined color is blue represented by the variables in the relationships $0.15<x<0.26$, $0.17<y<0.28$, and $25<Y<70$ in an XYZ color system. The color can be expressed by the following formula using three variables (x, y, and Y) in the XYZ color system:

Formula 1

$$x=X/(X+Y+Z), y=Y/(X+Y+Z)$$

Here, x and y are variables representing the chromaticity and the chromatiness, and X, Y, and Z are color stimulus specifications.

Hitherto, in a transflective liquid crystal device, when a colored layer is used in common in the transmissive display and in the reflective display, the chromaticity of a blue pixel tends to become darker than that of a red pixel and that of a green pixel in the reflective display, thereby making it very difficult to control the difference between the chromaticity in the transmissive display and that in the reflective display. To overcome this problem, in the embodiment, only at the blue pixel having a chromaticity that is difficult to adjust are the color transmissive display carried out using the resin layer 22 and the colored layer 25 and the color reflective display carried out using only the colored layer 25.

Although in the embodiment the resin layer 22 is colored blue over the entire substrate, only an area corresponding to the transmissive portion of the blue colored layer segment 25B may be colored blue. In this case, for example, by coloring blue only the area of the resin layer corresponding to the transmissive portion of the blue colored layer segment, and by making transparent the resin layer at the other areas, it is not necessary to form openings in the areas of the resin layer corresponding to the transmissive portions of the green and red colored layer segments. Therefore, it is not necessary to color all of the areas of the resin layer corresponding to the transmissive portions.

Next, a method for producing the above-described color filter substrate 20' will be described with reference to FIG. 5.

Figure 5:
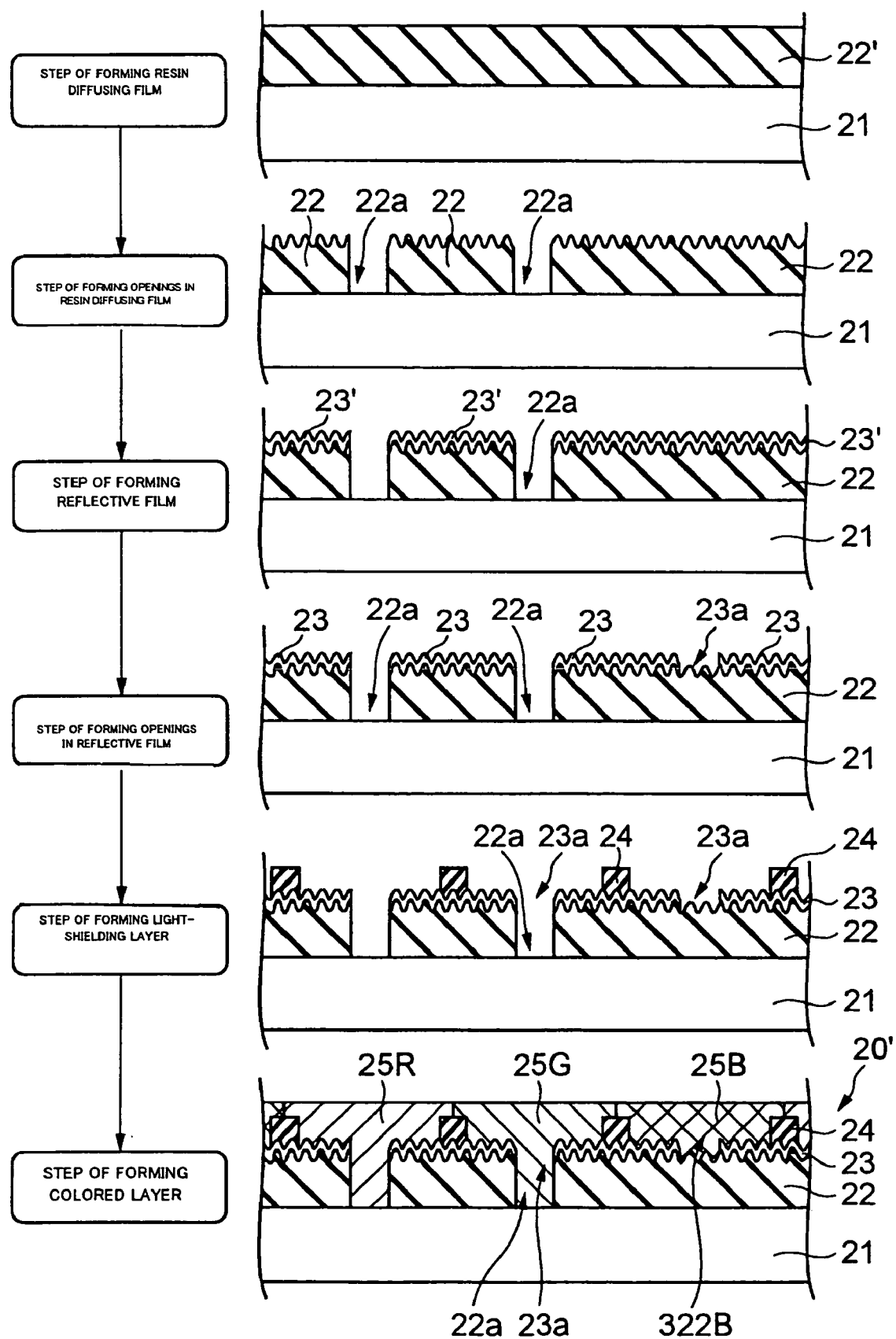
FIG. 5 illustrates the steps of producing the color filter substrate shown in FIG. 4.

FIG. 5 illustrates the steps of producing a color filter substrate 20' corresponding to the color filter substrate 20' shown in the partial sectional view of FIG. 4.

First, a resin diffusing film 22' is formed by depositing a blue resin diffusing film material onto a glass base plate 21 by spin coating to a thickness of, for example, 1.5 µm (step of forming a resin diffusing film). The resin diffusing film material is a negative resist having a blue pigment diffused through acrylic resin. Thereafter, using photolithography techniques, the surface of the resin diffusing film 22' is made bumpy, and first openings 22a are formed in the resin diffusing film 22', thereby forming a resin layer 22 (step of forming openings in the resin diffusing film). The first openings 22a correspond to a transmissive portion of a red colored layer segment and that of a green colored layer segment that are formed in a post-processing step.

Next, a reflective film 23' is formed of aluminum on the resin layer 22 by, for example, sputtering (step of forming reflective film). Thereafter, a reflective layer 23 having openings 23a, which become transmissive portions, are formed by removing portions of the reflective film 23' by photolithography and etching techniques (step of forming openings in the reflective film).

Next, a 1.0 µm light-shielding layer 24 is formed by forming a black resin film over the entire surface of the glass base plate 21 having the resin layer 22 and the reflective layer 23 formed thereon by spin coating, and by removing portions of the black resin film by photolithography techniques (step of forming light-shielding layer). The black resin film is a negative resist having a black pigment diffused through acrylic resin.

Next, a 1.0 µm red colored layer segment 25R including a color-free area layer 25Ra is formed by forming a red resin film over the entire surface of the glass base plate 21 having the reflective layer 23 and the light-shielding layer 24 formed thereon by spin coating, and by removing portions of the red resin film by photolithography techniques; and a green colored layer segment 25G and a blue colored layer segment 25B are similarly formed (step of forming a colored layer). The green colored layer segment 25G and the blue colored layer segment 25B have non-color area layers 25a. Here, the red resin film, a green resin film, and a blue resin film are negative resists having a red pigment, a green pigment, and a blue pigment diffused through acrylic resin, respectively. By the above-described steps, the color filter substrate 20' is produced.

A resin layer of a related color filter substrate is transparent and has openings in areas corresponding to transmissive portions of the resin layer at all of the red, green, and blue colored layer segments. In contrast, in the embodiment, the resin layer 22 is formed using a single color (blue) and the first openings 22a are formed in the areas of the resin layer 22 corresponding to the transmissive portions 26a of red and green pixels. Therefore, it is possible to form the color filter substrate of the embodiment without increasing the number of steps compared to the number of steps of producing the related color filter substrate.

SECOND EMBODIMENT

Hereunder, a second embodiment will be described. It differs from the first embodiment only in the structural features of a color filter substrate. Therefore, the other structural features that are the same as those of the first embodiment will not be described.

Figure 6:
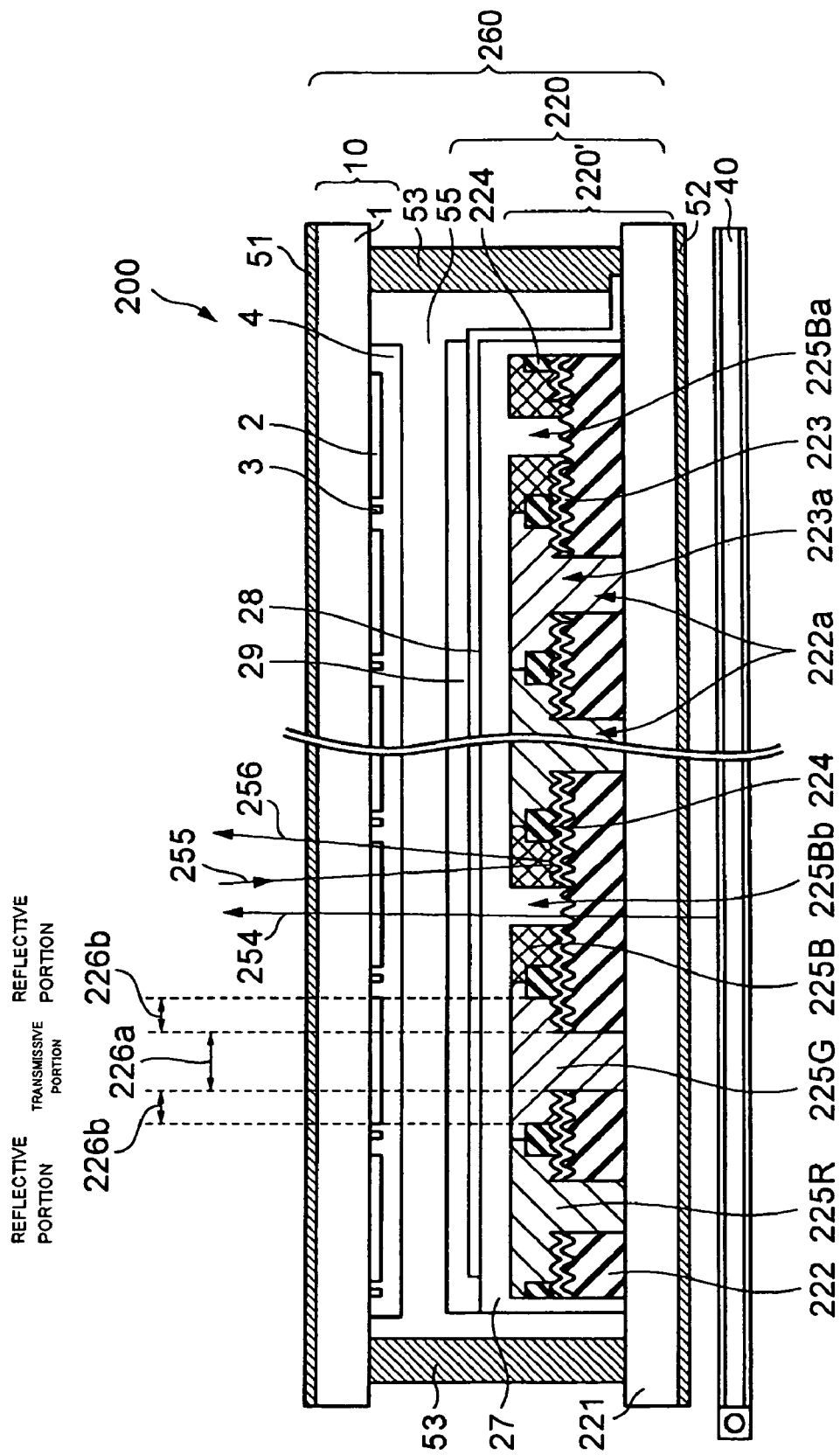
FIG. 6 is a schematic sectional view of the entire structure of a liquid crystal device of a second embodiment.
Figure 7:
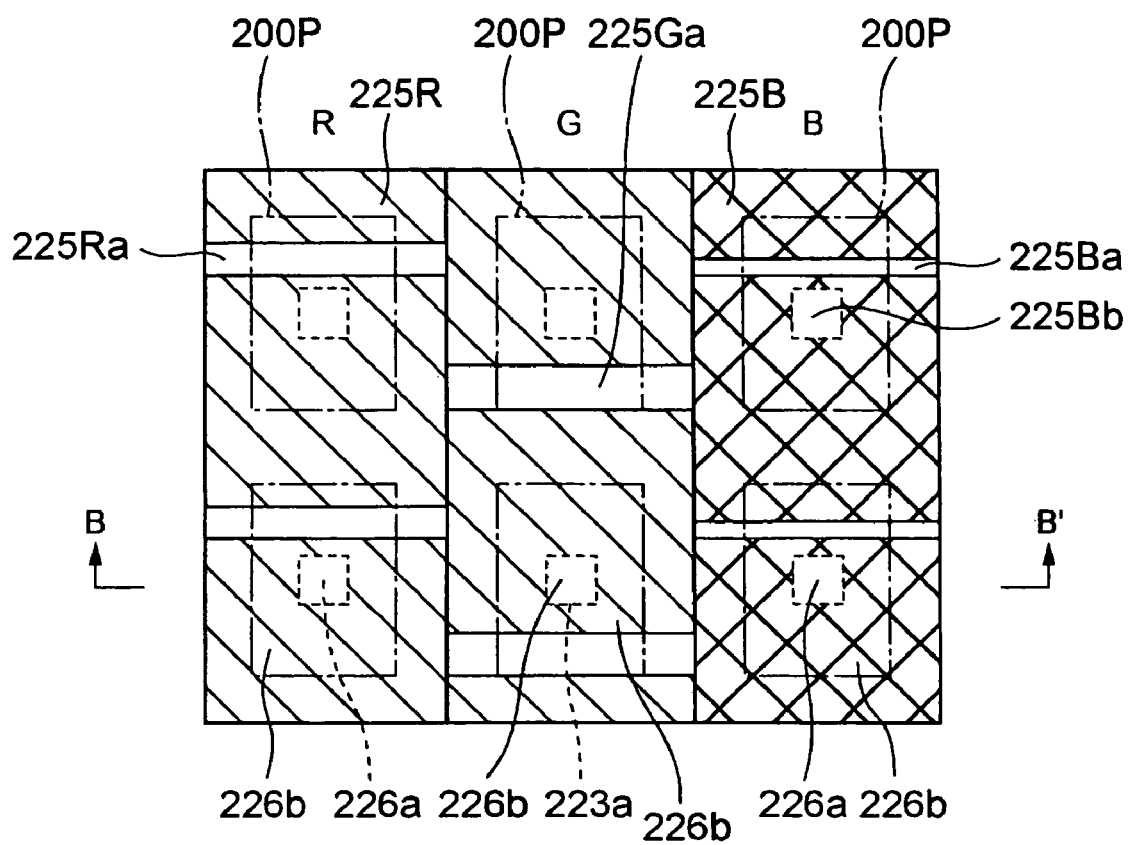
FIG. 7 is a schematic plan view showing planar shapes of a light-shielding layer and a colored layer of the liquid crystal device shown in FIG. 6.
Figure 8:
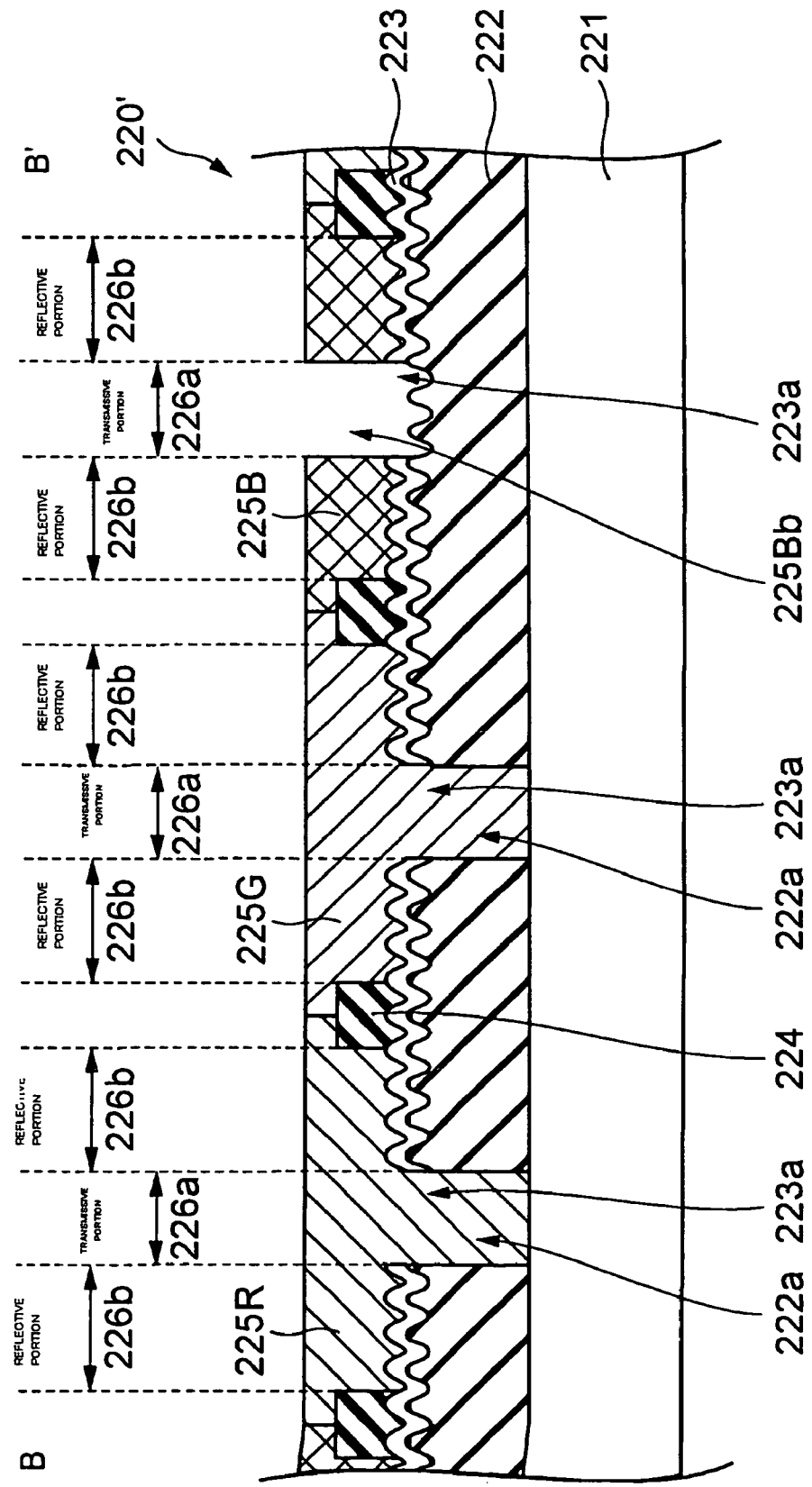
FIG. 8 is a schematic sectional view of a color filter substrate of the liquid crystal device shown in FIG. 6.

FIG. 6 is a schematic sectional view of a liquid crystal device serving as an electro-optical device of the second embodiment and incorporating a color filter substrate of the present invention. FIG. 7 illustrates planar shapes of a colored layer, and is a schematic plan view showing in an enlarged form a portion of the color filter substrate in the embodiment. FIG. 8 is a sectional view taken along line B–B' of FIG. 7(b).

A liquid crystal device 200 shown in FIG. 6 has a transflective active matrix structure. The liquid crystal device 200 comprises a liquid crystal panel 260 and a backlight 40 disposed adjacent thereto. The liquid crystal panel 260 comprises an opposing substrate 10, a color filter electrode substrate 220, a sealant 53 for affixing the two substrates, a liquid crystal layer 55 sandwiched between the two substrates 10 and 220, and a pair of polarizers 51 and 52 disposed so as to sandwich the two substrates 10 and 220. The color filter electrode substrate 220 is formed by successively disposing an overcoat layer 27, an opposing electrode 28, and an alignment layer 29 upon a colored layer 225 of a color filter substrate 220' shown in FIG. 8.

As shown in FIGS. 6 and 8, in the color filter substrate 220', a blue resin layer 222 is disposed on a glass substrate 221, and a reflective layer 223 having openings 223a, which are transmissive portions, are disposed on the resin layer 222. In addition, a light-shielding layer 224 is disposed on the reflective layer 223 in a lattice so as to section pixels, and the colored layer 225 of three colors, red (R), green (G), and blue (B), is disposed on the reflective layer 223 in a stripe so as to embed the areas sectioned by the light-shielding layer 224. When the liquid crystal device 200 is viewed in a direction perpendicular to the substrate, the colored layer 225 is disposed so as to overlap the reflective layer 223 in a plane.

Similarly to the reflective layer 23 shown in FIG. 3(a) in the first embodiment, in the embodiment also, as shown in FIG. 7, one opening 223a, which serves as a transmissive portion 226b, is disposed in the reflective layer 223 at each pixel 200P. Each pixel 200P includes a reflective portion 226b and the corresponding transmissive portion 226a. The reflective layer 223 is disposed at the reflective portions 226b, and is not disposed at the transmissive portions 226a corresponding to the openings 223a. As shown in FIGS. 6 and 8, a first opening 222a is formed in an area of the resin layer 222 corresponding to the transmissive portion 226a at a red colored layer segment 225R and in an area of the resin layer 222 corresponding to the transmissive portion 226a at a green colored layer segment 225G. The resin layer 222 does not exist in the first openings 222a, that is, the red colored layer segment 225R and the green colored layer segment 225G are disposed in the respective first openings 222a. The resin layer 222 exists in an area of the resin layer 222 corresponding to the transmissive portion 226a of the reflective layer 223 at the blue colored layer segment 225B. The colored layer segments 225R, 225G, and 225B have color-free area layers 225Ra, 225Ga, and 225Ba, respectively, where the colored layer segments 225R, 225G, and 225B are not disposed in areas of the pixels 200P corresponding to the reflective portions 226b, that is, the areas where the reflective layer 223 is not covered by the colored layer 225. The colored layer segment 225B has a second opening 225Bb where the colored layer segment 225B is not disposed in an area of the pixel 200P corresponding to the transmissive portion 226a.

As shown in FIG. 6, in the liquid crystal device 200, when the reflective display is performed, outside light 255, such as natural light or light from indoor lighting, traveling towards and impinging upon the liquid crystal device 200 is transmitted through the opposing substrate 10, the liquid crystal layer 55, and the colored layer 225. Then, it is reflected by the corresponding reflective portion 226b of the reflective layer 223 as reflected light 256; is transmitted again through the colored layer 225, the liquid crystal layer 55, and the opposing substrate 10; and exits from the liquid crystal device 200. Accordingly, the light used for display is transmitted through the colored layer twice. In addition, when the reflective display is performed, outside light, such as natural light or light from indoor lighting, traveling towards and impinging upon the liquid crystal device 200 is transmitted through the opposing substrate 10, the liquid crystal layer 55, and the color-free area layers 225a. Then, it is reflected by the reflective portions 226b of the reflective layer 223; is transmitted again through the color-free area layers 225a, the liquid crystal layer 55, and the opposing substrate 10; and exits from the liquid crystal device 200.

In contrast, when the transmissive display is performed, light 254 emitted from the backlight 40 is transmitted through the liquid crystal panel 260, and exits from the liquid crystal device 200. Accordingly, the light used for display is transmitted through the colored layer once.

Here, as mentioned above, in the pixel 200P corresponding to the red colored layer segment 225R and the pixel 200P corresponding to the green colored layer segment 225G, the areas of the resin layer 222 corresponding to the transmissive portions 226a are first openings 222a where the resin layer 222 does not exist. Therefore, the display colors of the red pixel 200P and the green pixel 200P are determined by the colored layer segment 225R and the colored layer segment 225G, respectively.

In contrast, the display color of the blue pixel 200P is determined only by the blue resin layer 222B in the transmissive display, and only by the colored layer segment 225B in the reflective display.

As in the case of the blue pixel, by performing color transmissive display using the resin layer 222, and by performing the color reflective display using only the colored layer 225, it becomes easier to adjust the chromaticity in the transmissive display and that in the reflective display, so that a desired chromaticity can be obtained in both the transmissive display and the reflective display. Therefore, it is possible to provide a liquid crystal device having good display properties. In other words, the chromaticities of the colors of the colored layer 225 are adjusted so as to provide color display properties suitable for the reflective display, and that of the color of the diffusing resin layers 222 is adjusted so as to be suitable for the transmissive display, that is, so that the light transmitted through the colored layer twice has desired color display properties. This allows the color display properties of the transmissive display and those of the reflective display to be adjusted separately, thereby making it easier to carry out the adjustments. In the embodiment, the chromaticity of the blue colored layer segment 225B is less than the chromaticity of the blue resin layer 222. For example, the color of the resin layer 222B is blue represented by the variables in the relationships $x<0.17$, $y<0.22$, and $5<Y<40$ in an XYZ color system, and the color of the colored layer segment 225B is blue represented by the variables in the relationships $0.15<x<0.26$, $0.17<y<0.28$, and $25<Y<70$ in the XYZ color system.

Next, a method for producing the above-described color filter substrate 220' will be described with reference to FIG. 9.

Figure 9:
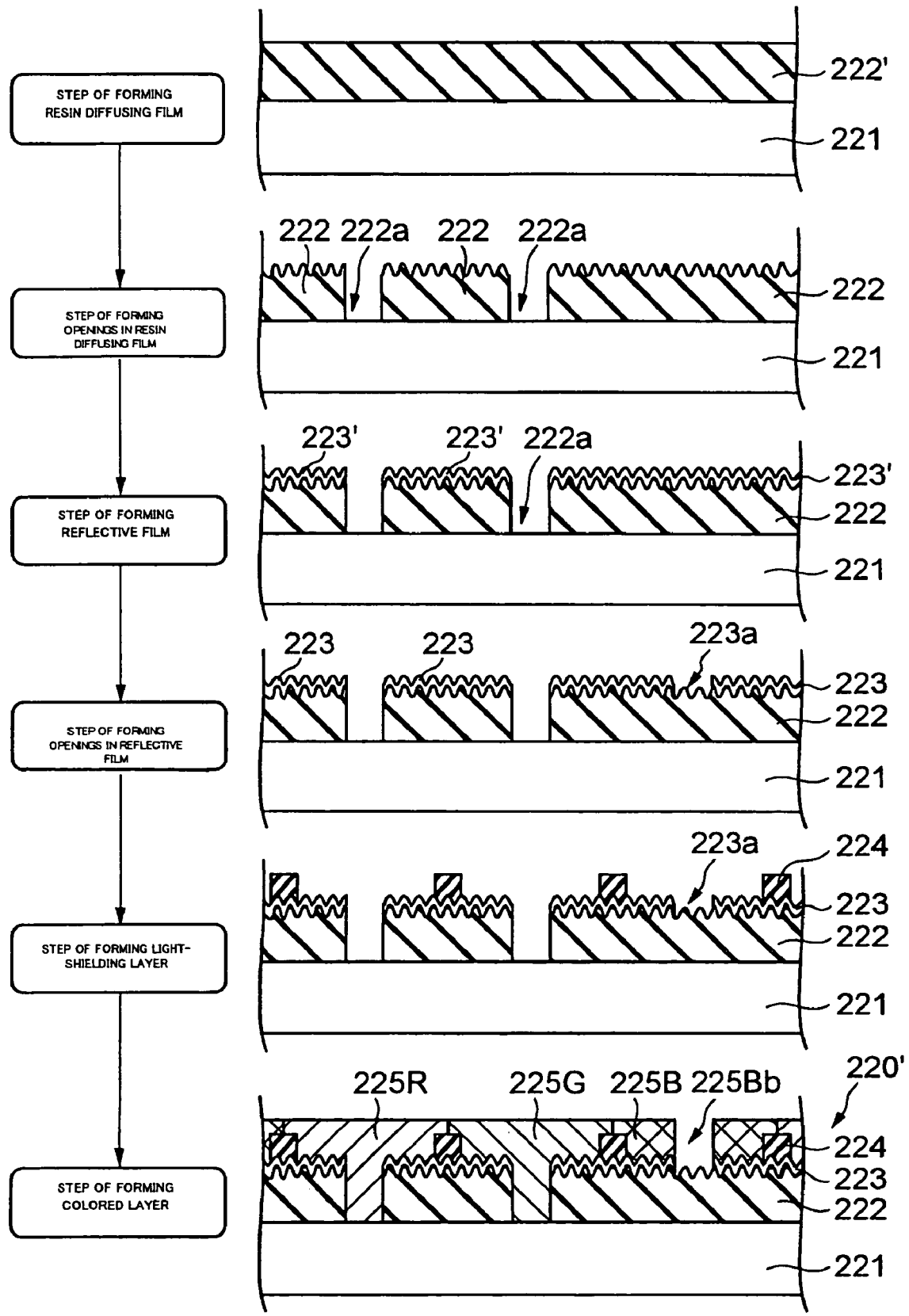
FIG. 9 illustrates the steps of producing the color filter substrate shown in FIG. 8.

FIG. 9 illustrates the steps of producing a color filter substrate 220' corresponding to the color filter substrate 220' shown in the partial sectional view of FIG. 8. The method for producing the color filter substrate of the embodiment differs from the method for producing the color filter substrate in the first embodiment in the chromaticity of a resin layer and a patterning shape used when a blue colored layer segment 225B is formed. The description of the features of the method that are similar to those of the method in the first embodiment will be simplified.

First, a resin diffusing film 222' is formed on a glass base plate 221 (step of forming a resin diffusing film). Then, using photolithography techniques, the surface of the resin diffusing film 222' is made bumpy, and first openings 222a are formed in the resin diffusing film 222', thereby forming a resin layer 222 (step of forming openings in the resin diffusing film).

Next, a reflective film 223' is formed of aluminum on the resin layer 222 (step of forming reflective film). Thereafter, a reflective layer 223 having openings 223a, which become transmissive portions, are formed by removing portions of the reflective film 223' (step of forming openings in the reflective film).

Next, a light-shielding layer 224 is formed (step of forming a light-shielding layer). Then, a red colored layer segment 225R, a green colored layer segment 225G and a blue colored layer segment 225B are formed (step of forming a colored layer).

Openings, which become color-free area layers 225a, are formed in the red colored layer segment 225R and the green colored layer segment 225G. A second opening 225Bb corresponding to a transmissive portion 226a and a color-free area layer 225Ba are formed in the blue colored layer segment 225B. By the above-described steps, the color filter substrate 220' is produced.

THIRD EMBODIMENT

Hereunder, a third embodiment will be described. It differs from the first embodiment only in the structural features of a color filter substrate. Therefore, the other structural features that are the same as those of the first embodiment will not be described.

Although in the first and second embodiments the resin layers are formed using a single color (blue), they may be formed using two or more colors. Hereunder, a color filter substrate including a resin layer of three colors will be described.

Figure 10:
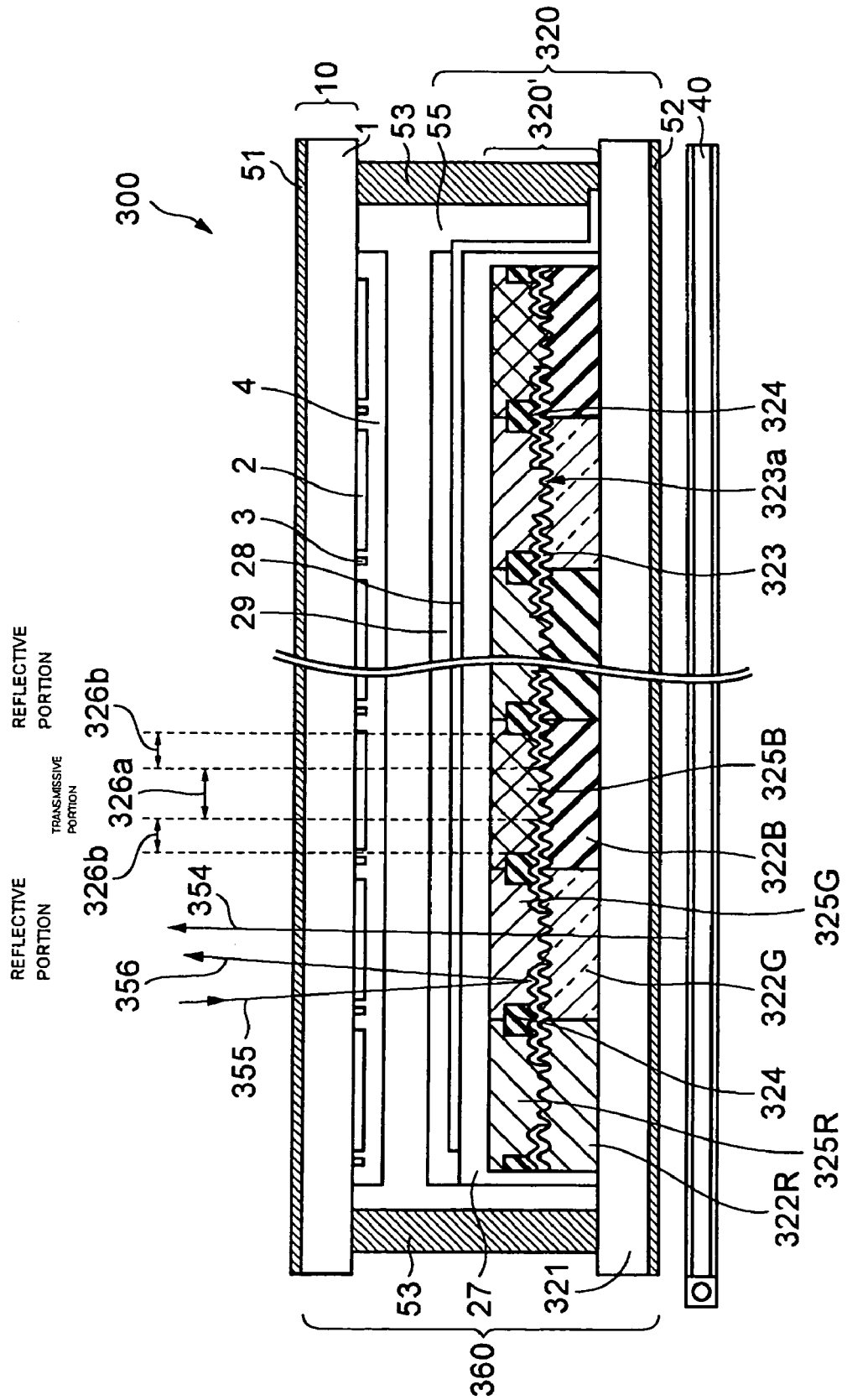
FIG. 10 is a schematic sectional view of the entire structure of a liquid crystal device of a third embodiment.
Figure 11:
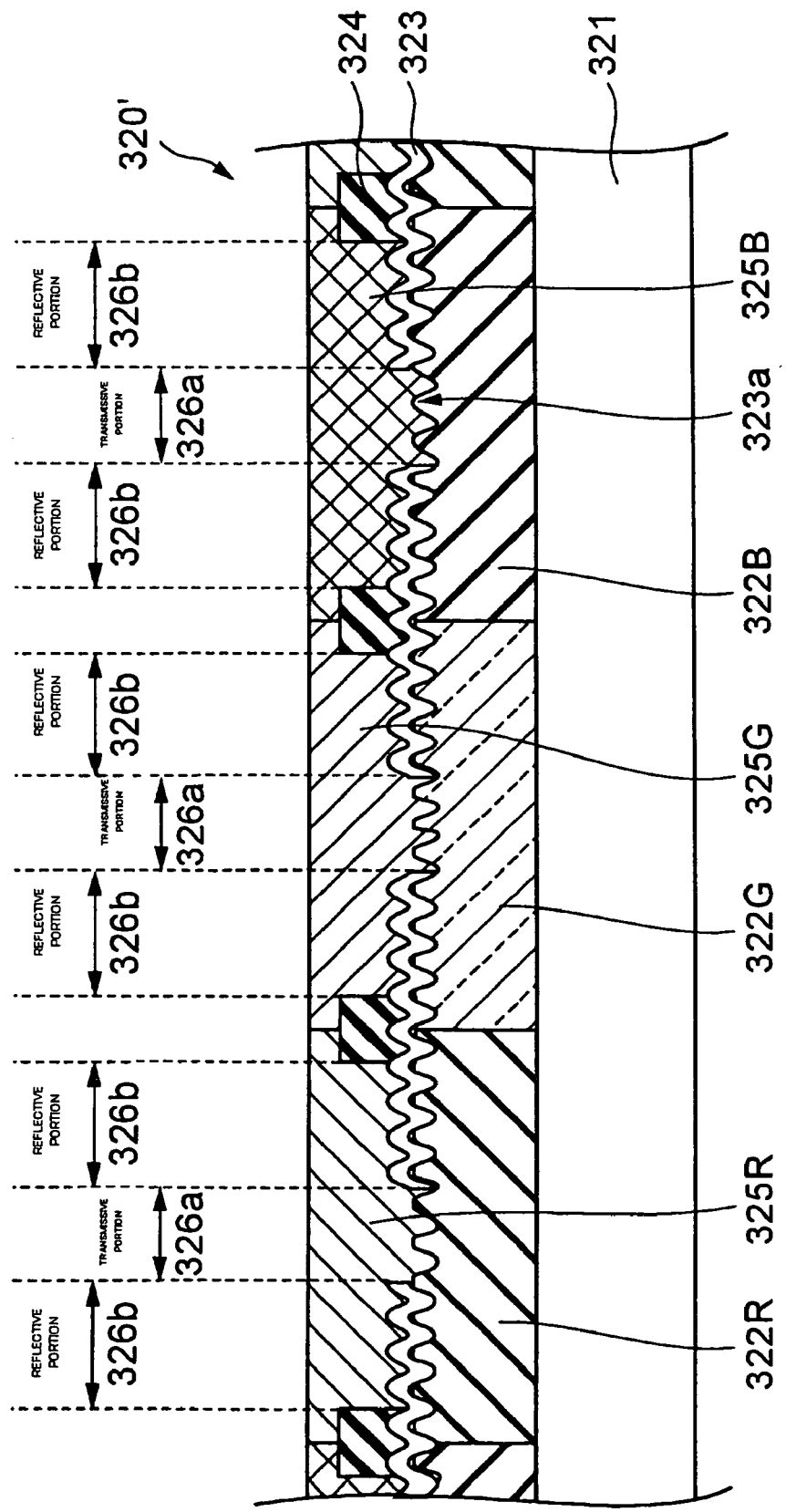
FIG. 11 is a schematic sectional view of a color filter substrate of the liquid crystal device shown in FIG. 10.

FIG. 10 is a schematic sectional view of a liquid crystal device serving as an electro-optical device of the third embodiment and incorporating a color filter substrate of the present invention. FIG. 11 is a partial sectional view of the color filter substrate.

A liquid crystal device 300 shown in FIG. 10 has a transflective active matrix structure. The liquid crystal device 300 comprises a liquid crystal panel 360 and a backlight 40 disposed adjacent thereto. The liquid crystal panel 360 comprises an opposing substrate 10, a color filter electrode substrate 320, a sealant 53 for affixing the two substrates, a liquid crystal layer 55 sandwiched between the two substrates 10 and 320, and a pair of polarizers 51 and 52 disposed so as to sandwich the two substrates 10 and 320. The color filter electrode substrate 320 is formed by successively disposing an overcoat layer 27, an opposing electrode 28, and an alignment layer 29 upon a colored layer 325 of a color filter substrate 320' shown in FIG. 8.

As shown in FIGS. 10 and 11, in the color filter substrate 320', a red, green, and blue resin layer 322 is disposed in a stripe on a glass base plate 321, and a reflective layer 323 having openings 323a, which are transmissive portions 326a, is disposed on the resin layer 322. Further, a light-shielding layer 324 is disposed on the reflective layer 323 in a lattice so as to section pixels, and a colored layer 325 of three colors, red (R), green (G), and blue (B), is disposed on the reflective layer 323 so as to embed the areas sectioned by the light-shielding layer 324. When the liquid crystal device 300 is viewed in a direction perpendicular to the substrate, the colored layer 325 is disposed so as to overlap the reflective layer 323 in a plane.

A red resin layer segment 322R is disposed in a stripe in correspondence with a red colored layer segment 325R, a green resin layer segment 322G is disposed in a stripe in correspondence with a green colored layer segment 325G, and a blue resin layer segment 322B is disposed in a stripe in correspondence with a blue colored layer segment 325B. In other words, the portion of the resin layer 322 corresponding to the red colored layer segment 325R is such that at least an area of the resin layer 322 corresponding to the transmissive portion 326a is colored red; the portion of the resin layer 322 corresponding to the green colored layer segment 325G is such that at least an area of the resin layer 322 corresponding to the transmissive portion 326a is colored green; and the portion of the resin layer 322 corresponding to the blue colored layer segment 325B is such that at least an area of the resin layer 322 corresponding to the transmissive portion 326a is colored blue.

In the liquid crystal device 300, for all color pixels, when reflective display is performed, outside light 355, which is a portion of outside light, (such as natural light or light from indoor lighting) traveling towards and impinging upon the liquid crystal device 300 is transmitted through the opposing substrate 10, the liquid crystal layer 55, and the colored layer 325. Then, it is reflected by a reflective portion 326b of the reflective layer 323 as reflected light 356; is transmitted again through the colored layer 325, the liquid crystal layer 55, and the opposing substrate 10; and exits from the liquid crystal device 300. Accordingly, the light used for display is transmitted through the colored layer twice. In addition, when the reflective display is performed, other portions of the outside light, such as natural light or light from indoor lighting, traveling towards and impinging upon the liquid crystal device 300 are transmitted through the opposing substrate 10, the liquid crystal layer 55, the color-free area layers (not shown) at the respective pixels; are reflected by the other reflective portions 326b of the reflective layer 323; are transmitted again through the color-free area layers, the liquid crystal layer 55, and the opposing substrate 10; and exit from the liquid crystal device 300.

In contrast, when transmissive display is performed, light 354 emitted from the backlight 40 is transmitted through the transmissive portions 326a of the reflective layer 323, and exits from the liquid crystal device 300. Accordingly, the light used for display is transmitted through the colored layer once.

Therefore, in the embodiment, not only is the display color of the blue pixel determined like the display color of the blue pixel in the first embodiment, but also are the display colors of the red and green pixels determined by the colored layer 325 in the reflective display and by the resin layer 322 and the colored layer 325 in the transmissive display. In this way, when, at all pixels disposed in display areas used at least for a displaying operation, color transmissive display is carried out using the resin layer 322 and the colored layer 325, and color reflective display is carried out using only the colored layer 325, it becomes easier to adjust the chromaticity in the transmissive display and that in the reflective display, so that a desired chromaticity can be obtained in both the transmissive display and the reflective display. Therefore, it is possible to provide a liquid crystal device having good display properties with good color balance of red, green, and blue. In other words, the chromaticities of the colors of the colored layer 325 are previously determined so as to be suitable for the reflective display, that is, so that the light transmitted through the colored layer twice is of a desired color. Thereafter, the chromaticities of the colors of the resin layer 322 are determined so that the light transmitted through the colored layer 325 and the resin layer 322 has a desired color in the transmissive display. This allows the color display properties of the transmissive display and those of the reflective display to be adjusted substantially separately, thereby making it easier to carry out the adjustments.

In the embodiment, the chromaticity of the blue colored layer segment 325B is less than the chromaticity of the blue resin layer segment 322B. In addition, the blue colored layer segment 325B and the blue resin layer segment 322B are colored so that their combined color is blue represented by the variables in the relationships $0.15<x<0.26$, $0.17<y<0.28$, and $25<Y<70$ in an XYZ color system. The red colored layer segment 325R and the red resin layer segment 322R are colored so that their combined color is red represented by the variables in the relationships $0.35<x<0.50$ and $30<Y<70$, and having any value of y in the XYZ color system. The green colored layer segment 325G and the green resin layer segment 322G are colored so that their combined color is green represented by the variables in the relationships $0.30<y<0.45$ and $70<Y<75$, and having any value of x in the XYZ color system.

Although in the embodiment the colored layer exists in the areas corresponding to the transmissive portions, second openings may be formed in the colored layer at the areas corresponding to the transmissive portions, as in the blue colored layer segment in the second embodiment. In this case, the color display properties of the transmissive display are determined by the resin layer and those of the reflective display are determined by the colored layer. Here, the blue colored layer segment is formed so that its color is blue represented by the variables in the relationships $0.15<x<0.26$, $0.17<y<0.28$, and $25<Y<70$ in the XYZ color system; and the resin layer segment is formed so that its color is blue represented by the variables in the relationships $x<0.17$, $y<0.22$, and $5<Y<40$ in the XYZ color system. The red colored layer segment is formed so that its color is red represented by the variables in the relationships $0.35<x<0.50$ and $30<Y<70$, and having any value of y in the XYZ color system; and the resin layer segment is formed so that its color is red represented by the variables in the relationships $x>0.45$ and $15<Y<60$, and having any value of y in the XYZ color system. The green colored layer segment is formed so that its color is green represented by the variables in the relationships $0.30<y<0.45$ and $70<Y<95$, and having any value of x in the XYZ color system; and the resin layer segment is formed so that its color is green represented by the variables in the relationships $y>0.4$ and $30<Y<90$, and having any value of x in the XYZ color system.

Next, a method for producing the above-described color filter substrate 320' will be described with reference to FIG. 12.

Figure 12:
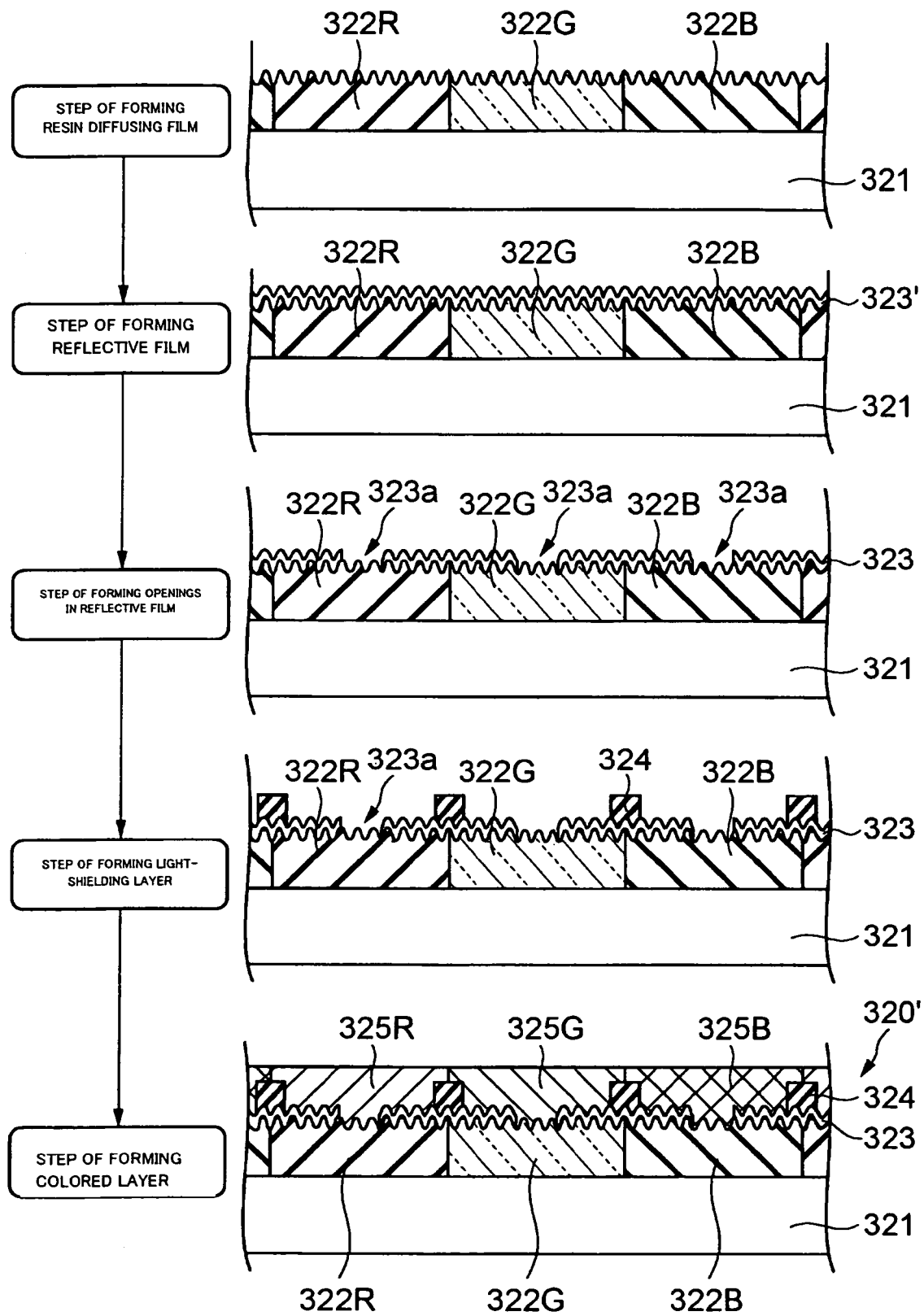
FIG. 12 illustrates the steps of producing the color filter substrate shown in FIG. 11.

FIG. 12 illustrates the steps of producing a color filter substrate 320' corresponding to the color filter substrate 320' shown in the partial sectional view of FIG. 11. The method for producing the color filter substrate of the embodiment differs from the method for producing the color filter substrate in the first embodiment in that a resin layer is formed using three colors, first openings are not formed in the resin layer, and the resin layer and a colored layer have different chromaticities. The description of the features of the method that are the same as those in the method of the first embodiment will be simplified.

First, a red resin diffusing film is formed by depositing a red resin diffusing film material onto a glass base plate 321 by spin coating. Thereafter, using photolithography techniques, the surface of the red resin diffusing film is made bumpy, and is subjected to patterning, thereby forming a red resin layer segment 322R; and a green resin layer segment 322G and a blue resin layer segment 322B are similarly successively formed (step of forming a resin layer). The resin diffusing film materials of the respective colors are negative resists having pigments of the respective colors diffused through acrylic resin.

Next, a reflective film 323' is formed of aluminum on the resin layer 322 (step of forming a reflective film). Thereafter, a reflective layer 323 having openings 323a, which become transmissive portions, is formed by removing portions of the reflective film 323' (step of forming openings in the reflective film).

Next, a light-shielding layer 324 is formed (step of forming a light-shielding layer). Next, a red colored layer segment 325R, a green colored layer segment 325G and a blue colored layer segment 325B are formed (step of forming a colored layer).

By the above-described steps, the color filter substrate 320' is produced.

Transflective Substrate and Electro-Optical Device Using the Transflective Substrate Although in each of the first to third embodiments a liquid crystal device using TFD elements is described, the present invention is applicable to a liquid crystal device using two-terminal elements other than TFD elements, to a single matrix liquid crystal device, and to a liquid crystal device using TFT elements. Hereunder, a liquid crystal device using TFT elements of a fourth embodiment will be described.

FOURTH EMBODIMENT

Figure 13:
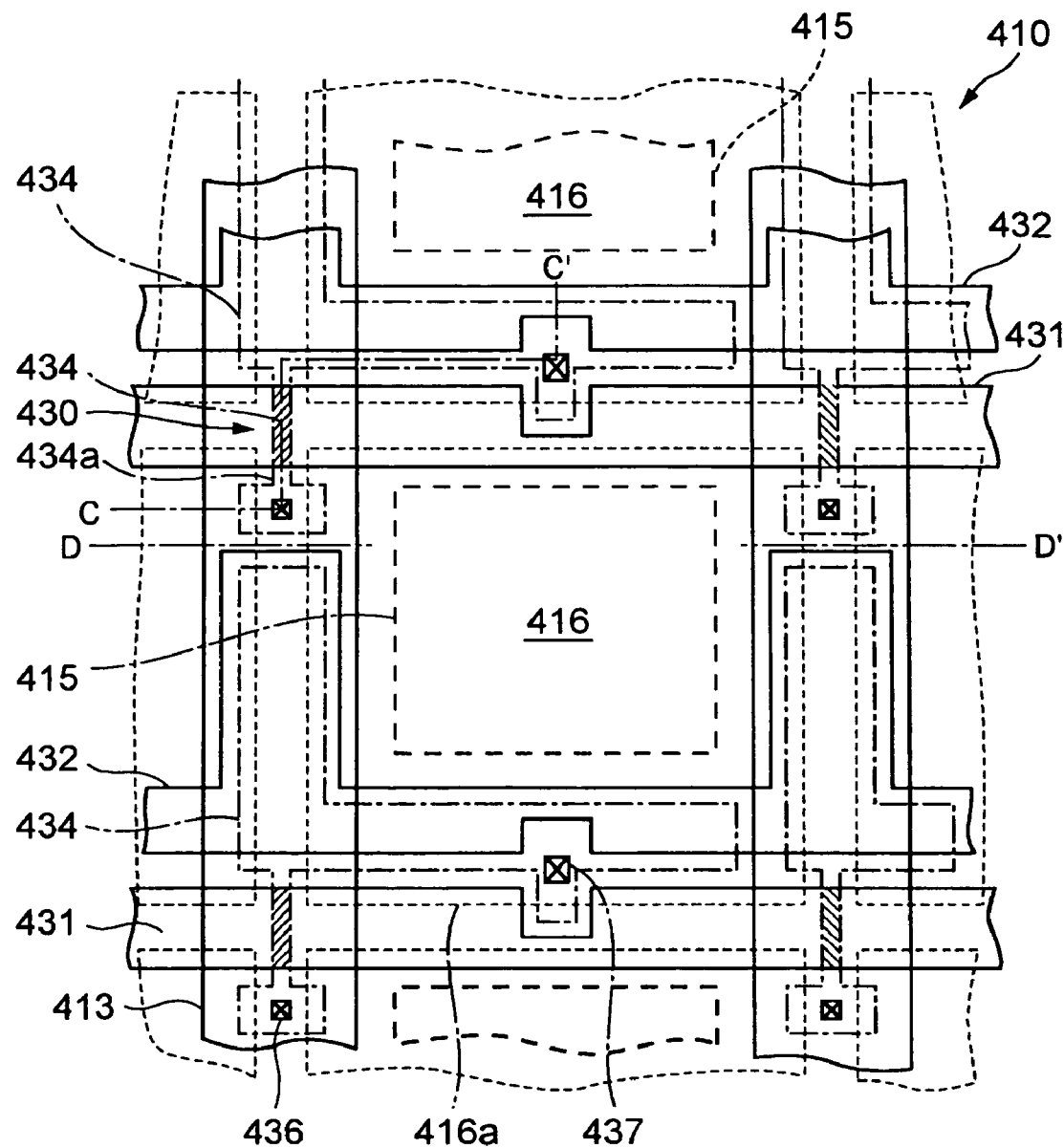
FIG. 13 is a partial plan view of a transflective substrate in a fourth embodiment.

FIG. 13 is an enlarged schematic plan view of a transflective substrate of a liquid crystal device serving as an electro-optical device of the embodiment, and shows the relationships between the positions of various elements.

Figure 14:
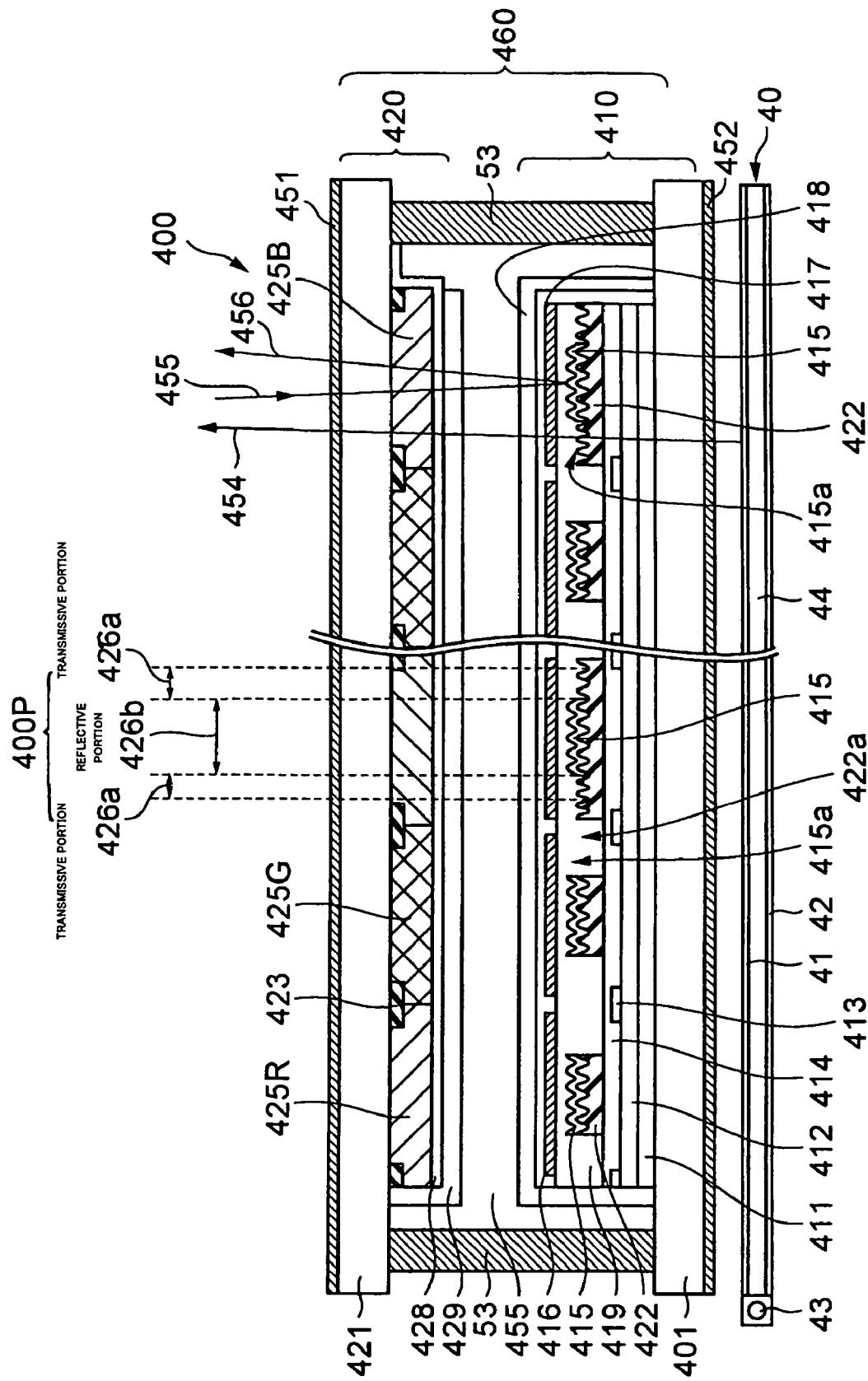
FIG. 14 is a schematic sectional view of a liquid crystal device comprising the transflective substrate shown in FIG. 13.
Figure 15:
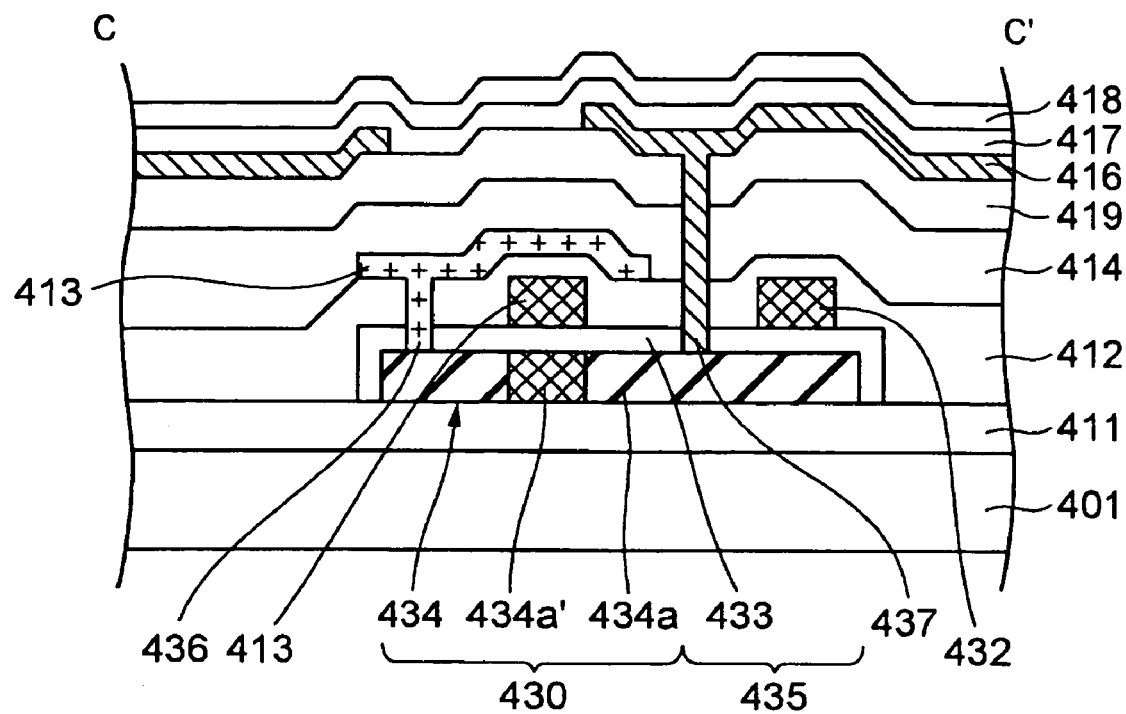
FIG. 15 is a schematic sectional view of the transflective substrate taken along line C–C' of FIG. 13.

FIG. 14 is a schematic sectional view of the liquid crystal device of the embodiment, and includes a sectional view taken along line D-D' of FIG. 13. FIG. 15 is a sectional view taken along line C-C' of FIG. 13.

In the first to third embodiments, the colored layer, the resin layer, and the reflective layer are formed on the same substrate. In contrast, in the fourth embodiment, a colored layer, and a resin layer and a reflective layer are formed on different substrates. This is a big difference between the fourth embodiment and the other embodiments. Hereunder, parts in the fourth embodiment corresponding to those in the first embodiment are given the same reference numerals, and will not be described below.

A liquid crystal device 400 shown in FIG. 14 has an active matrix structure using a transflective TFT element. The liquid crystal device 400 comprises a liquid crystal panel 460 and a backlight 40 disposed adjacent thereto. The liquid crystal panel 460 comprises a transflective substrate 410, a color filter substrate 420, a sealant 53 for affixing the two substrates, a liquid crystal layer 55 sandwiched between the two substrates 410 and 420, and a pair of polarizers 451 and 452 disposed so as to sandwich the two substrates 410 and 420.

As shown in FIGS. 13 and 14, in the liquid crystal device 400, a TFT 430 for controlling pixel electrodes 416 is formed in a matrix, and data lines 413 for supplying image signals thereto are electrically connected to the source of the TFT 430. Scanning lines 431 are electrically connected to the gate of the TFT 430, and scanning signals are applied to the scanning lines 431 in pulses at a predetermined timing. The pixel electrodes 416 are electrically connected to the drain of the TFT 430. The pixel electrodes 416 cause the image signals supplied from the data lines 413 to be written at a predetermined timing by closing the TFT 430, which is switching element, for a certain time period. The image signals of a predetermined level written onto the liquid crystals through the pixel electrodes 416 are held for a certain time period between the pixel electrodes 416 and an opposing electrode 428. Here, in order to prevent the held image signals from leaking, a storage capacitor 435 is additionally disposed parallel to a liquid crystal capacitor formed between the pixel electrodes 416 and the opposing electrode 428.

In FIG. 13, the pixel electrodes 416 (having a periphery 416a shown by dotted lines in the figure) are disposed in a matrix on the transflective substrate 410, and the data lines 413, the scanning lines 431, and capacitive lines 432 are disposed at the vertical and horizontal boundaries of the pixel electrodes 416. The data lines 413 are electrically connected to a source area of a semiconductor layer 434 (formed of polysilicon film) through a contact hole 436. The pixel electrodes 416 are electrically connected to a drain area of the semiconductor layer 434a through a contact hole 437. The capacitive lines 432 are disposed opposite to a first storage capacitance electrode extending from a drain area of the semiconductor layer 434a through an insulating film, and form the storage capacitor 435. The scanning lines 431 are disposed so as to oppose a channel area 434a' (shown by slanted lines extending towards the upper right) of the semiconductor layer 434. The scanning lines 431 function as a gate electrode. In this way, the TFT 430 having the scanning lines 431 disposed as a gate electrode opposite to the channel area 434a' are disposed at intersections of the scanning lines 431 and the data lines 413.

As shown in FIG. 14, the color filter substrate 420 is formed by successively disposing a lattice light-shielding layer 423, a red colored layer segment 425R, a green colored layer segment 425G, and a blue colored layer segment 425B, an overcoat layer 427, the opposing electrode 428, and an alignment layer 429 upon a glass base plate 421. The red colored layer segment 425R, the green colored layer segment 425G, and the blue colored layer segment 425B embed areas sectioned by the light-shielding layer 423. The opposing electrode 428 is formed of a solid film disposed substantially over the entire substrate. The alignment layer 429 is a thin organic film, such as a polyamide film, and is rubbed. When the liquid crystal device 400 is viewed in a direction perpendicular to the substrate, a colored layer 425 is disposed so as to overlap a reflective layer 415 in a plane.

As shown in FIGS. 13 to 15, in the transflective substrate 410, a first insulating film 411 is disposed as an underlying film for the TFT 430 on a glass base plate 401, and the semiconductor layer 434 is disposed on the first insulating film 411. A second insulating film 433 is disposed on the semiconductor layer 434, and the scanning lines 431 and the capacitance lines 432 are disposed on the second insulating film 433 and the first insulating film 411. A third insulating film 412 is disposed on the scanning lines 431 and the capacitance lines 432; and the data lines 413, formed of Al or the like, are disposed at the third insulating film. The data lines 413 are disposed at the second insulating film 433 and the third insulating film 412, and are connected to the source area of the semiconductor layers 434 through the contact hole 436.

A fourth insulating film 414 is disposed on the data lines 413, and a blue resin layer 422 and the Al reflective layer 415 are successively formed on the fourth insulating film 414. The reflective layer 415 and the resin layer 422 are formed in the shape of islands at pixels. At each pixel, an area where the reflective layer 415 is not formed is a light-transmissive area and functions as a transmissive portion 426a, and an area where the reflective layer 415 is formed functions as a reflective portion 426b. In the embodiment, at the pixels corresponding to the red colored layer segment 425R and the green colored layer segment 425G, the resin layer 422 and the reflective layer 415 are formed with the same planar shapes and flush with each other. In contrast, at the pixel corresponding to the blue colored layer segment 425B, the resin layer 422 is formed with the same planar shape as the corresponding pixel electrode 416, and the reflective layer 415 has a planar shape that is smaller than the resin layer 422.

A fifth insulating film 419 is disposed on the reflective layer 415. The pixel electrodes 416, formed of ITO, are disposed on the fifth insulating film 419, and are electrically connected to the drain area of the semiconductor layer 434 through the contact hole 437 formed in the second insulating film 433, the third insulating film 412, the fourth insulating film 414, and the fifth insulating film 419. In addition, the pixel electrodes 416 are formed with planar shapes that are larger than those of portions of the reflective layer 415, so that portions of the pixel electrodes 416 overlap the capacitance lines 432 in a plane. A sixth insulating film 417 and an alignment layer 418 are successively disposed on the pixel electrodes 416.

In the liquid crystal device 400 of the embodiment, electric fields are successively applied to portions of the liquid crystal layer 55 corresponding to intersections of the pixel electrodes 416 and the opposing electrode 428, so that the liquid crystal layer 55 at the pixels is optically changed, thereby performing a displaying operation.

As shown in FIGS. 13 and 14, the reflective layers 415 are formed with island shapes at the corresponding pixels 400P. In other words, the reflective layers 415 are disposed so that openings 415a, which are the frame-shaped transmissive portions 426a, are disposed at the respective pixels 400P. That is, each pixel 400P includes the reflective portion 426b where its associated reflective layer 415 exists and the transmissive portion 426a where its associated reflective layer 415 does not exist. First openings 422a where the resin layers 422 do not exist are formed in areas of the resin layers 422 corresponding to the transmissive portions 426a corresponding to the red colored layers 425R and areas of the resin layers 422 corresponding to the transmissive portions 426a corresponding the green colored layers 425G. In contrast, the resin layers 422 exist in areas of the resin layers 422 corresponding to the transmissive portions 426a of the reflective layers 415 corresponding to the blue colored layers 425B.

As shown in FIG. 14, in the liquid crystal device 400, when reflective display is performed, outside light 455, such as natural light or light from indoor lighting, traveling towards and impinging upon the liquid crystal device 400 is transmitted through the color filter substrate 420 and the liquid crystal layer 55. Then, it is reflected by the reflective portion 426b of the reflective layer 415 as reflected light 456, is transmitted again through the liquid crystal layer 55 and the color filter substrate 420, and exits from the liquid crystal device 400. Accordingly, the light used for display is transmitted through the colored layer twice. In contrast, when transmissive display is performed, light 454 emitted from the backlight 40 is transmitted through the liquid crystal panel 460, and exits from the liquid crystal device 400. Accordingly, the light used for display is transmitted through the colored layer once.

Here, as mentioned above, in the pixel 400P corresponding to the red colored layer segment 425R and the pixel 400P corresponding to the green colored layer segment 425G, the resin layer 422 does not exist in the areas corresponding to the transmissive portions 426a of the resin layer 422. Therefore, in both the transmissive display and the reflective display, the display colors of the red pixel 400P and the green pixel 400P are determined by the colored layer segment 425R and the colored layer segment 425G, respectively. In contrast, the display color of the blue pixel 400P is determined by the blue resin layer 422 and the colored layer segment 425B in the transmissive display, and by the colored layer segment 425B in the reflective display.

As in the case of the blue pixel, by performing color transmissive display using the resin layer 422 and the colored layer 425, and by performing the color reflective display using only the colored layer 425, it becomes easy to adjust the color display properties in the transmissive display and in the reflective display, so that desired chromaticities can be obtained in both the transmissive display and the reflective display. Therefore, it is possible to provide a liquid crystal device having good display properties.

Electronic Apparatus

Figure 16:
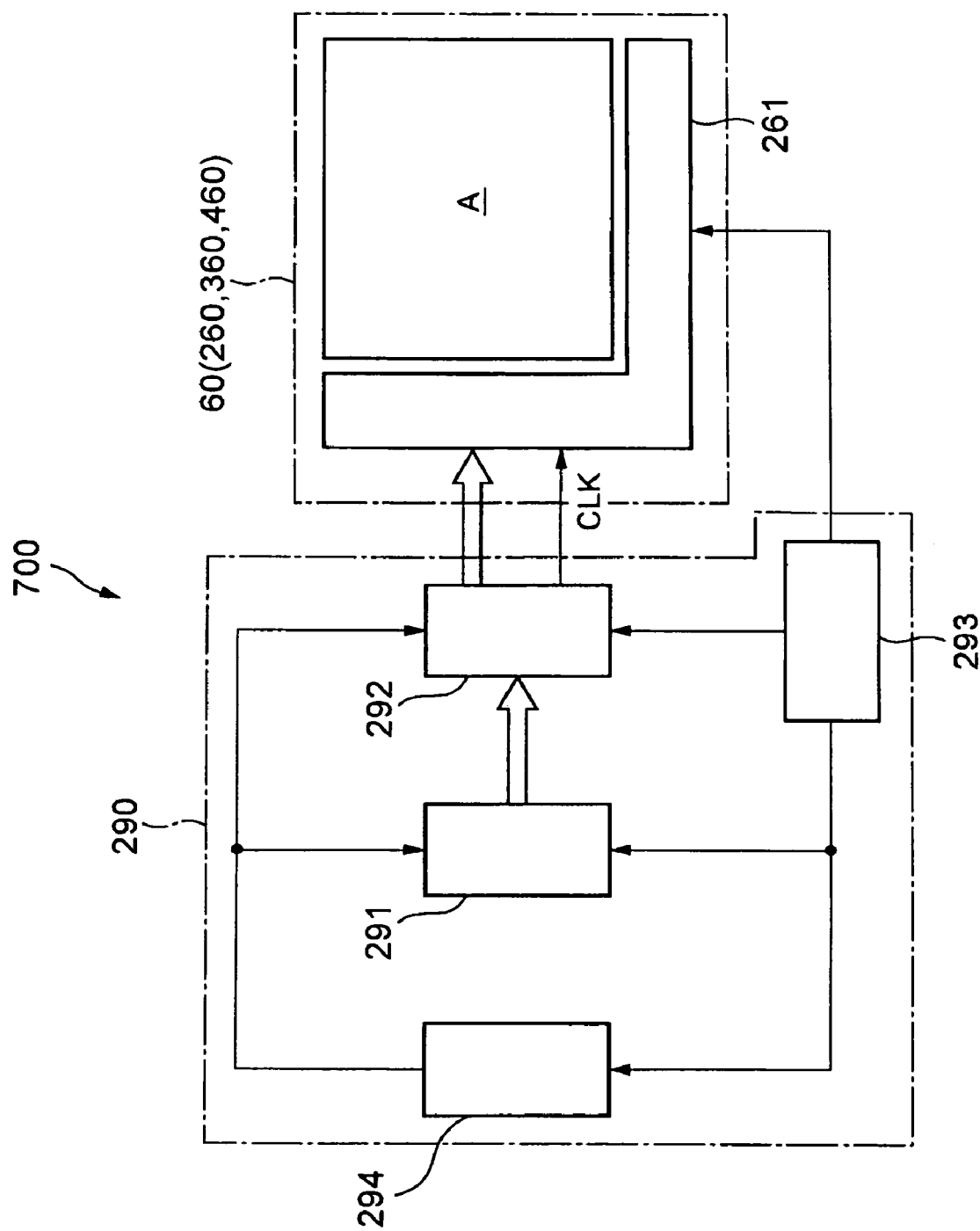
FIG. 16 is a block diagram of the structure of an electronic apparatus of the present invention.

An electronic apparatus of an embodiment of the present invention will be described with reference to FIG. 16. In this embodiment, the case in which the liquid crystal panel 60 (260, 360, 460) used in any one of the above-described liquid crystal devices is used as displaying means of the electronic apparatus will be described. FIG. 16 is a schematic view of the entire structure of a controlling system (display controlling system) used as controlling means of the liquid crystal panel 60 (260, 360, 460) in an electronic apparatus 700 of the embodiment. The electronic apparatus shown here comprises a display control circuit 290 including a display information output source 291, a display information processing circuit 292, a power source circuit 293, and a timing generator 294.

The above-described liquid crystal panel 60 (260, 360, 460) has a drive circuit 261 for driving a display area A.

The display information output source 291 comprises a memory, such as read only memory (ROM) or random access memory (RAM); a storage unit including, for example, a magnetic recording disk or an optical recording disk; and a tuning circuit for tuning and outputting a digital image signal. The display information output source 291 is constructed so that display information is supplied in the form of, for example, an image signal having a predetermined format to the display information processing circuit 292, based on various clock signals generated by the timing generator 294.

The display information processing circuit 292 comprises various known circuits, such as a serial-parallel converting circuit, an amplifier/inverter circuit, a rotation circuit, a gamma correction circuit, and a clamp circuit. It processes the display information input thereto, and supplies the image information along with a clock signal CLK to the drive circuit 261. The drive circuit 261 includes a scanning line drive circuit, a data line drive circuit, and a checking circuit. The power source circuit 293 applies a predetermined voltage to each of the aforementioned components.

Specific examples of the electronic apparatus include, for example, a cellular phone and a personal computer.

The electro-optical device and the electronic apparatus of the present invention are not limited to the above-described examples, so that various modifications may obviously be made within the gist of the present invention. For example, although the electro-optical device of each of the embodiments is a liquid crystal device comprising a liquid crystal panel, a liquid crystal display device comprising various electro-optical panels other than the liquid crystal panel, such as an inorganic electroluminescence unit, an organic electroluminescence unit, a plasma display unit, a field emission display (FED), or a surface-conduction electron-emitter display (SED), may also be used.

What is claimed is:

1. A color filter substrate comprising:
   a base plate;
   a resin layer disposed over the base plate;
   a reflective layer disposed at certain areas over the resin layer;
   a transmissive portion located over the resin layer at other areas different from the certain areas where the reflective layer is disposed; and
   a colored layer disposed over at least the reflective layer, wherein at least a portion of the resin layer is colored, the colored portion of the resin layer corresponding to the transmissive portion.

2. A color filter substrate according to claim 1, wherein the colored layer is disposed over the transmissive portion, and the at least a portion of an area corresponding to the transmissive portion of the resin layer is colored with a hue which is the same as that of the colored layer disposed in correspondence with the transmissive portion.

3. A color filter substrate according to claim 2, wherein the area corresponding to the transmissive portion of the resin layer is colored so that a combined color of the resin layer and the colored layer is blue represented by variables in the relationships $0.15<x<0.26$, $0.17<y<0.28$, and $25<Y<70$ in an XYZ color system.

4. A color filter substrate according to claim 1, wherein the colored layer is not disposed in the area corresponding to the transmissive portion, and the color of the at least a portion of an area corresponding to the transmissive portion of the resin layer is blue represented by variables in the relationships $x<0.17$, $y<0.22$, and $5<Y<40$ in an XYZ color system.

5. A color filter substrate according to claim 4, wherein the color of the colored layer is blue represented by variables in the relationships $0.15<x<0.26$, $0.17<y<0.28$, and $25<Y<70$ in the XYZ color system.

6. A color filter substrate according to claim 1, wherein the colored layer comprises colored layer segments of a plurality of colors, and the resin layer is colored using at least one of the plurality of colors, and has an opening corresponding to the transmissive portion disposed in correspondence with the colored layer segments of the other color or colors.

7. A color filter substrate according to claim 6, wherein at least blue is included in the plurality of colors.

8. A color filter substrate according to claim 1, wherein the colored layer comprises colored layer segments of a plurality of colors, and at least the area corresponding to the transmissive portion of the resin layer is colored with the same hues as the colored layer segments disposed in correspondence with the transmissive portion.

9. electro-optical device comprising the color filter substrate of claim 1.

10. A method for producing a color filter substrate comprising the steps of:
    forming a colored resin layer over a substrate;
    forming a reflective layer over the colored resin layer, the reflective layer including a reflective portion where the reflective layer is disposed and a transmissive portion where the reflective layer is not disposed; and
    forming a colored layer having the same hue as the colored resin layer over the reflective layer.

11. A color filter substrate comprising:
    a pixel including a reflective portion where a reflective layer is disposed and a transmissive portion where the reflective layer is absent;
    a base plate;
    a resin layer disposed over the base plate in the pixel, the reflective layer disposed over the resin layer in a part of the pixel; and
    a colored layer disposed in the pixel over at least the reflective layer,
    wherein a portion of the resin layer corresponding to the transmissive portion of the pixel is colored with a hue which is the same as that of the colored layer disposed in the pixel.

12. The color filter substrate of claim 11, wherein
    the pixel corresponds to blue; and
    the colored layer is absent from the transmissive portion.

13. The color filter substrate of claim 11, wherein the colored layer is disposed in the transmissive portion; and
    a portion of the resin layer corresponding to the reflective layer and the portion of the resin layer corresponding to the transmissive portion are same material.

14. A method for producing a color filter substrate that includes a pixel comprising:
    forming a colored resin layer over a substrate in the pixel;
    forming a reflective layer over the colored resin layer in a part of the pixel,
    forming a colored layer having the same hue as the colored resin layer over the reflective layer and the colored resin layer in the pixel.

* * * * *